US012757064B2

(12) United States Patent
Li et al.

(10) Patent No.: US 12,757,064 B2
(45) Date of Patent: Oct. 6, 2026

(54) PRIORITY BASED CHANNEL ACCESS PROCEDURE FOR SIDELINK COMMUNICATIONS

(71) Applicant: QUALCOMM Incorporated, San Diego, CA (US)

(72) Inventors: Qing Li, Princeton Junction, NJ (US); Ozcan Ozturk, San Diego, CA (US); Junyi Li, Fairless Hills, PA (US); Sherif Elazzouni, San Diego, CA (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 739 days.

(21) Appl. No.: 17/821,380

(22) Filed: Aug. 22, 2022

(65) Prior Publication Data

US 2024/0064553 A1 Feb. 22, 2024

(51) Int. Cl.

| | |
|---|---|
| ***H04W 28/02*** | (2009.01) |
| ***H04W 72/566*** | (2023.01) |
| ***H04W 74/0808*** | (2024.01) |
| *H04W 72/02* | (2009.01) |
| *H04W 92/18* | (2009.01) |

(52) U.S. Cl.

CPC ..... *H04W 28/0268* (2013.01); *H04W 72/566* (2023.01); *H04W 74/0808* (2013.01); *H04W 72/02* (2013.01); *H04W 92/18* (2013.01)

(58) Field of Classification Search

CPC ........... H04W 28/0268; H04W 72/566; H04W 74/0808; H04W 72/02; H04W 92/18

See application file for complete search history.

(56) References Cited

U.S. PATENT DOCUMENTS

| | | | | |
|---|---|---|---|---|
| 11,641,580 | B2 * | 5/2023 | Zhang | H04W 12/03 713/151 |
| 11,812,308 | B2 * | 11/2023 | Sun | H04W 72/20 |
| 12,082,243 | B2 * | 9/2024 | Zhang | H04W 74/04 |
| 2020/0314895 | A1 | 10/2020 | Bergström | |
| 2020/0351409 | A1 * | 11/2020 | Karampatsis | H04W 76/30 |
| 2020/0351669 | A1 * | 11/2020 | Xu | H04W 76/14 |
| 2021/0195637 | A1 * | 6/2021 | Xue | H04W 74/0808 |
| 2021/0235512 | A1 * | 7/2021 | Lee | H04W 48/02 |
| 2021/0259039 | A1 * | 8/2021 | Pan | H04W 28/0967 |

(Continued)

OTHER PUBLICATIONS

International Search Report and Written Opinion—PCT/US2023/070608—ISA/EPO—Nov. 22, 2023.

(Continued)

*Primary Examiner* — Mounir Moutaouakil

(74) *Attorney, Agent, or Firm* — Harrity & Harrity LLP/QUALCOMM Incorporated

(57) ABSTRACT

Various aspects of the present disclosure generally relate to wireless communication. In some aspects, a network node may receive, from a user equipment (UE), an indication of a quality of service (QoS) parameter associated with a sidelink communication. The network node may map the QoS parameter to a sidelink channel access priority class (SL CAPC) associated with a sidelink channel access procedure for the sidelink communication. The network node may transmit, to the UE, an indication of the SL CAPC associated with the sidelink channel access procedure for the sidelink communication. Numerous other aspects are provided.

24 Claims, 15 Drawing Sheets

(56) References Cited

U.S. PATENT DOCUMENTS

| | | | | |
|---|---|---|---|---|
| 2021/0298070 | A1 | 9/2021 | Zhang et al. | |
| 2021/0329534 | A1* | 10/2021 | Szrom | H04W 48/04 |
| 2022/0109969 | A1* | 4/2022 | Qaisrani | H04W 4/029 |
| 2022/0140939 | A1* | 5/2022 | Sevindik | H04L 1/0026<br>455/454 |
| 2023/0284128 | A1* | 9/2023 | Yan | H04W 8/20<br>370/329 |
| 2023/0299836 | A1* | 9/2023 | Zhou | H04W 16/28<br>370/329 |
| 2024/0276243 | A1* | 8/2024 | Chen | H04W 76/14 |
| 2024/0349326 | A1* | 10/2024 | Park | H04W 72/563 |
| 2025/0274952 | A1* | 8/2025 | Han | H04W 28/0268 |

OTHER PUBLICATIONS

OPPO: "Access Mechanisms and Resource Allocation for NR Sidelink in Unlicensed Channel", 3GPP TSG-RAN WG1 Meeting #110, R1-2206290, 3rd Generation Partnership Project, Mobile Competence Centre, 650, Route Des Lucioles, F-06921 Sophia-Antipolis Cedex, France, vol. RAN WG1, No. Toulouse, France, Aug. 22, 2022-Aug. 26, 2022, Aug. 12, 2022, 19 Pages, XP052274223, Sections 2.2.1 to 2.2.2.

* cited by examiner

600

| Sidelink Channel Access Priority Class (SL CAPC) $sl_p$ (602) | $sl\_m_{sl\_p}$ (604) | $sl\_CW_{min,sl\_p}$ (606) | $sl\_CW_{max,sl\_p}$ (608) | $sl\_T_{m\,cot,sl\_p}$ (610) | Allowed $sl\_CW_{sl\_p}$ sizes (612) |
|---|---|---|---|---|---|
| 1 | 1 or 2 | 3 | 7 | 2 ms | {3,7} |
| 2 | 1 or 2 | 7 | 15 | 3 or 4 ms | {7,15} |
| 3 | 3 | 15 | 1023 | 6 or 8 or 10 ms | {15,31,63,127,255,511,1023} |
| 4 | 7 | 15 | 1023 | 6 or 8 or 10 ms | {15,31,63,127,255,511,1023} |

FIGURE 6

700

| Sidelink Channel Access Priority Class (SL CAPC) *sl_p* (704) | V2X PQI (706) | V2X Priority Level (708) | ProSe PQI (710) | ProSe Priority Level (712) |
| --- | --- | --- | --- | --- |
| 1 | 91 | 2 | {24,60} | 1 |
| 2 | {21,23,55,90} | 3 | {25,26} | 2 |
| 3 | {22,58} | 4 | | |
| 4 | 57<br>{56,59} | 5<br>6 | 92<br>{61,93} | 5<br>6 |
| | V2X service | | ProSe service | |

702

| Sidelink Channel Access Priority Class (SL CAPC) *sl_p* (714) | Sidleink Layer 1 Priority Values (716) |
| --- | --- |
| 1 | 1 or {1,2} |
| 2 | {2,3} or {3,4} |
| 3 | {4,5} or {5,6} |
| 4 | {6,7,8} or {7,8} |

FIGURE 7

PRIORITY BASED CHANNEL ACCESS PROCEDURE FOR SIDELINK COMMUNICATIONS

FIELD OF THE DISCLOSURE

Aspects of the present disclosure generally relate to wireless communication and specifically, to techniques and apparatuses for a priority based channel access procedure for sidelink communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipment (UE) to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

In some examples, UEs may communicate directly with each other via sidelinks. Such UEs may communicate using a spectrum shared with other UEs or radio access technologies, such as when communicating in an unlicensed frequency band (sometimes referred to as communicating in a sidelink unlicensed (SLU) mode). When a UE and a network device are communicating on an access link in an unlicensed frequency band, such as when operating in an NR unlicensed band, interfering communications may be reduced by implementing a priority based listen-before-talk (LBT) procedure, such as a LBT procedure associated with a channel access priority class (CAPC), to ensure a communication channel is free of colliding communications. However, no such priority based LBT procedure is available for sidelink communications. Accordingly, UEs communicating in an SLU mode may experience high interference levels, leading to degraded signals or radio link failure, high latency, low throughput, and otherwise inefficient usage of network resources.

SUMMARY

Some aspects described herein relate to a network node for wireless communication. The network node may include at least one processor and at least one memory, communicatively coupled with the at least one processor, that stores processor-readable code. The processor-readable code, when executed by the at least one processor, may be configured to cause the network node to receive, from a user equipment (UE), an indication of a quality of service (QoS) parameter associated with a sidelink communication. The processor-readable code, when executed by the at least one processor, may be configured to cause the network node to map the QoS parameter to a sidelink channel access priority class (SL CAPC) associated with a sidelink channel access procedure for the sidelink communication. The processor-readable code, when executed by the at least one processor, may be configured to cause the network node to transmit, to the UE, an indication of the SL CAPC associated with the sidelink channel access procedure for the sidelink communication.

Some aspects described herein relate to a UE for wireless communication. The UE may include at least one processor and at least one memory, communicatively coupled with the at least one processor, that stores processor-readable code. The processor-readable code, when executed by the at least one processor, may be configured to cause the user equipment to perform a sidelink channel access procedure associated with a sidelink channel based at least in part on an SL CAPC associated with a QoS parameter associated with a sidelink communication. The processor-readable code, when executed by the at least one processor, may be configured to cause the user equipment to transmit, to another UE, the sidelink communication via the sidelink channel based at least in part on the sidelink channel access procedure.

Some aspects described herein relate to a UE for wireless communication. The UE may include at least one processor and at least one memory, communicatively coupled with the at least one processor, that stores processor-readable code. The processor-readable code, when executed by the at least one processor, may be configured to cause the UE to receive, from another UE, an indication of an SL CAPC associated with a QoS parameter associated with a sidelink communication. The processor-readable code, when executed by the at least one processor, may be configured to cause the UE to perform a sidelink channel access procedure associated with a sidelink channel based at least in part on the SL CAPC. The processor-readable code, when executed by the at least one processor, may be configured to cause the UE to transmit, to the other UE, the sidelink communication via the sidelink channel based at least in part on the sidelink channel access procedure.

Some aspects described herein relate to a method of wireless communication performed by a network node. The method may include receiving, from a UE, an indication of a QoS parameter associated with a sidelink communication. The method may include mapping the QoS parameter to an SL CAPC associated with a sidelink channel access procedure for the sidelink communication. The method may include transmitting, to the UE, an indication of the SL CAPC associated with the sidelink channel access procedure for the sidelink communication.

Some aspects described herein relate to a method of wireless communication performed by a UE. The method may include performing a sidelink channel access procedure associated with a sidelink channel based at least in part on an SL CAPC associated with a QoS parameter associated with a sidelink communication. The method may include transmitting, to another UE, the sidelink communication via the sidelink channel based at least in part on the sidelink channel access procedure.

Some aspects described herein relate to a method of wireless communication performed by a UE. The method may include receiving, from another UE, an indication of an SL CAPC associated with a QoS parameter associated with a sidelink communication. The method may include performing a sidelink channel access procedure associated with a sidelink channel based at least in part on the SL CAPC. The method may include transmitting, to the other UE, the sidelink communication via the sidelink channel based at least in part on the sidelink channel access procedure.

Some aspects described herein relate to a non-transitory computer-readable medium that stores a set of instructions for wireless communication by a network node. The set of instructions, when executed by one or more processors of the network node, may cause the network node to receive, from a UE, an indication of a QoS parameter associated with a sidelink communication. The set of instructions, when executed by one or more processors of the network node, may cause the network node to map the QoS parameter to an SL CAPC associated with a sidelink channel access procedure for the sidelink communication. The set of instructions, when executed by one or more processors of the network node, may cause the network node to transmit, to the UE, an indication of the SL CAPC associated with the sidelink channel access procedure for the sidelink communication.

Some aspects described herein relate to a non-transitory computer-readable medium that stores a set of instructions for wireless communication by a UE. The set of instructions, when executed by one or more processors of the UE, may cause the UE to perform a sidelink channel access procedure associated with a sidelink channel based at least in part on an SL CAPC associated with a QoS parameter associated with a sidelink communication. The set of instructions, when executed by one or more processors of the UE, may cause the UE to transmit, to another UE, the sidelink communication via the sidelink channel based at least in part on the sidelink channel access procedure.

Some aspects described herein relate to a non-transitory computer-readable medium that stores a set of instructions for wireless communication by a UE. The set of instructions, when executed by one or more processors of the UE, may cause the UE to receive, from another UE, an indication of an SL CAPC associated with a QoS parameter associated with a sidelink communication. The set of instructions, when executed by one or more processors of the UE, may cause the UE to perform a sidelink channel access procedure associated with a sidelink channel based at least in part on the SL CAPC. The set of instructions, when executed by one or more processors of the UE, may cause the UE to transmit, to the other UE, the sidelink communication via the sidelink channel based at least in part on the sidelink channel access procedure.

Some aspects described herein relate to an apparatus for wireless communication. The apparatus may include means for receiving, from a UE, an indication of a QoS parameter associated with a sidelink communication. The apparatus may include means for mapping the QoS parameter to an SL CAPC associated with a sidelink channel access procedure for the sidelink communication. The apparatus may include means for transmitting, to the UE, an indication of the SL CAPC associated with the sidelink channel access procedure for the sidelink communication.

Some aspects described herein relate to an apparatus for wireless communication. The apparatus may include means for performing a sidelink channel access procedure associated with a sidelink channel based at least in part on an SL CAPC associated with a QoS parameter associated with a sidelink communication. The apparatus may include means for transmitting, to a UE, the sidelink communication via the sidelink channel based at least in part on the sidelink channel access procedure.

Some aspects described herein relate to an apparatus for wireless communication. The apparatus may include means for receiving, from a UE, an indication of an SL CAPC associated with a QoS parameter associated with a sidelink communication. The apparatus may include means for performing a sidelink channel access procedure associated with a sidelink channel based at least in part on the SL CAPC. The apparatus may include means for transmitting, to the UE, the sidelink communication via the sidelink channel based at least in part on the sidelink channel access procedure.

Aspects generally include a method, apparatus, system, computer program product, non-transitory computer-readable medium, user equipment, base station, network node, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIG. 6 is a diagram illustrating an example table associated with a sidelink channel access priority class in accordance with the present disclosure.

FIG. 7 is a diagram illustrating example tables associated with mapping a sidelink channel access priority class to another priority class associated with a sidelink communication in accordance with the present disclosure.

DETAILED DESCRIPTION

Figure 1:
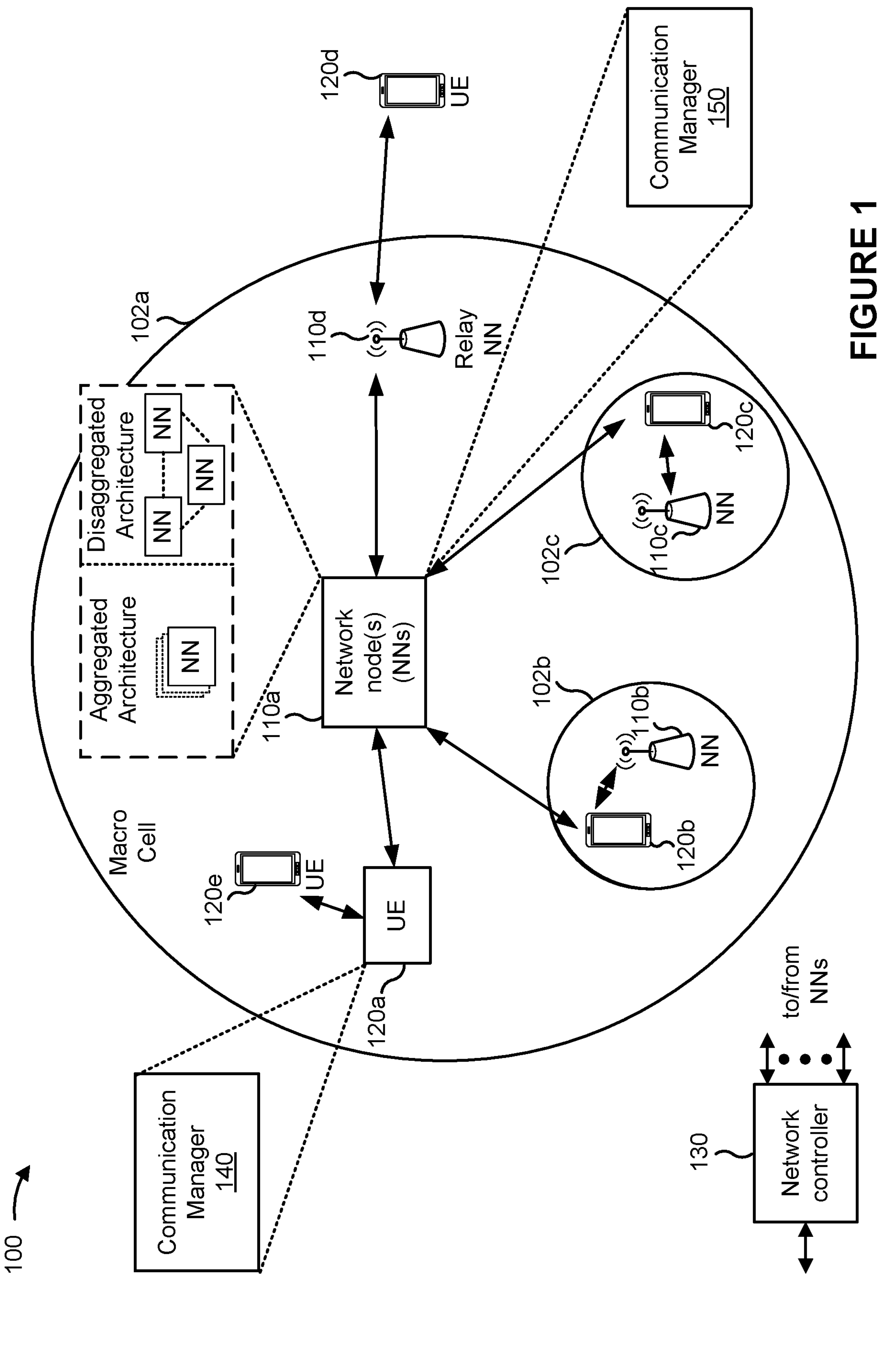
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to priority based channel access procedures for sidelink communications occurring in a shared spectrum, such as in an unlicensed frequency band. Some aspects more specifically relate to mapping a quality of service (QoS) parameter associated with a sidelink communication to a sidelink channel access priority class (SL CAPC). In some aspects, the SL CAPC may be associated with certain listen-before-talk (LBT) parameters or similar channel access parameters, such as a quantity of consecutive sensing slots associated with the channel access procedure, a minimum and maximum contention window associated with the channel, a maximum channel occupancy time (COT), or among other example parameters. In some aspects, a transmitting UE (Tx UE) may signal, to a network node, an indication of a QoS parameter associated with the sidelink communication, and the network node may map the QoS parameter to an SL CAPC and signal an indication of the SL CAPC to the Tx UE. In some other aspects, the Tx UE may map the QoS parameter to a SL CAPC absent signaling from the network node (for example, the Tx UE may autonomously map the QoS parameter to an SL CAPC based at least in part on an SL CAPC mapping lookup table, among other examples). The Tx UE may signal the SL CAPC to one or more receiving UEs (Rx UEs) or may communicate with the one or more Rx UEs based at least in part on the channel access procedure associated with the SL CAPC.

Particular aspects of the subject matter described in this disclosure can be implemented to realize one or more of the following potential advantages. In some examples, by mapping a QoS parameter associated with a sidelink communication to an SL CAPC, UEs operating in an unlicensed frequency band can prioritize sidelink communications, such that sidelink communications associated with high priority messages have improved access to reduced-interference channels, resulting in a reduction of communication errors and thus reduced power, computing, and network resource consumption that would have otherwise been required to correct communication errors. In some other examples, by mapping a QoS parameter associated with a sidelink communication to an SL CAPC, UEs operating in an unlicensed frequency band can schedule or otherwise coordinate competing communications, resulting in clearer communication channels and thus reduced latency, higher throughput, and overall more efficient utilization of network resources.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more network nodes 110 (shown as a network node (NN) 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), or other network entities. A network node 110 is an entity that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, or one or more DUs. A network node 110 may include, for example, an NR network node, an LTE network node, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, or backhaul interfaces, such as a direct physical connection, an air interface, or a virtual network, using any suitable transport network.

Each network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used.

A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts). In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (for example, three) cells. In some examples, a cell may not necessarily be stationary, and the geographic area of the cell may move according to the location of a network node 110 that is mobile (for example, a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link. In some aspects, the network controller 130 may be a CU or a core network device, or the network controller 130 may include a CU or a core network device.

In some examples, a cell may not necessarily be stationary, and the geographic area of the cell may move in accordance with the location of a network node 110 that is mobile (for example, a mobile network node). In some examples, the network nodes 110 may be interconnected to one another or to one or more other network nodes 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a network node 110 or a UE 120) and send a transmission of the data to a downstream station (for example, a UE 120 or a network node 110). A relay station may be a UE 120 that can relay transmissions for other UEs 120. In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. A network node 110 that relays communications may be referred to as a relay station, a relay network node, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120*a* and UE 120*e*) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a “Sub-6 GHz” band in various documents and articles. A similar nomenclature issue sometimes occurs in connection with FR2, which is often referred to (interchangeably) as a “millimeter wave” band in documents and articles, despite being different from the extremely high frequency (EHF) band (30 GHz-300 GHz) which is identified by the International Telecommunications Union (ITU) as a “millimeter wave” band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, the term “sub-6 GHz,” if used herein, may broadly represent frequencies that may be less than 6 GHz, may be within FR1, or may include mid-band frequencies. Further, unless specifically stated otherwise, the term “millimeter wave,” if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the network node 110 may include a communication manager 150. As described in more detail elsewhere herein, the communication manager 150 may receive, from a UE (for example, UE 120), an indication of a QoS parameter associated with a sidelink communication; map the QoS parameter to an SL CAPC associated with a sidelink channel access procedure for the sidelink communication; and transmit, to the UE, an indication of the SL CAPC associated with the sidelink channel access procedure for the sidelink communication. Additionally or alternatively, the communication manager 150 may perform one or more other operations described herein.

In some aspects, the UE 120 may include a communication manager 140. As described in more detail elsewhere herein, the communication manager 140 may perform a sidelink channel access procedure associated with a sidelink channel based at least in part on an SL CAPC associated with a QoS parameter associated with a sidelink communication; and transmit, to another UE, the sidelink communication via the sidelink channel based at least in part on the sidelink channel access procedure. In some other aspects, the communication manager 140 may receive, from another UE, an indication of an SL CAPC associated with a QoS parameter associated with a sidelink communication; perform a sidelink channel access procedure associated with a sidelink channel based at least in part on the SL CAPC; and transmit, to the other UE, the sidelink communication via the sidelink channel based at least in part on the sidelink channel access procedure. Additionally or alternatively, the communication manager 140 may perform one or more other operations described herein.

Figure 2:
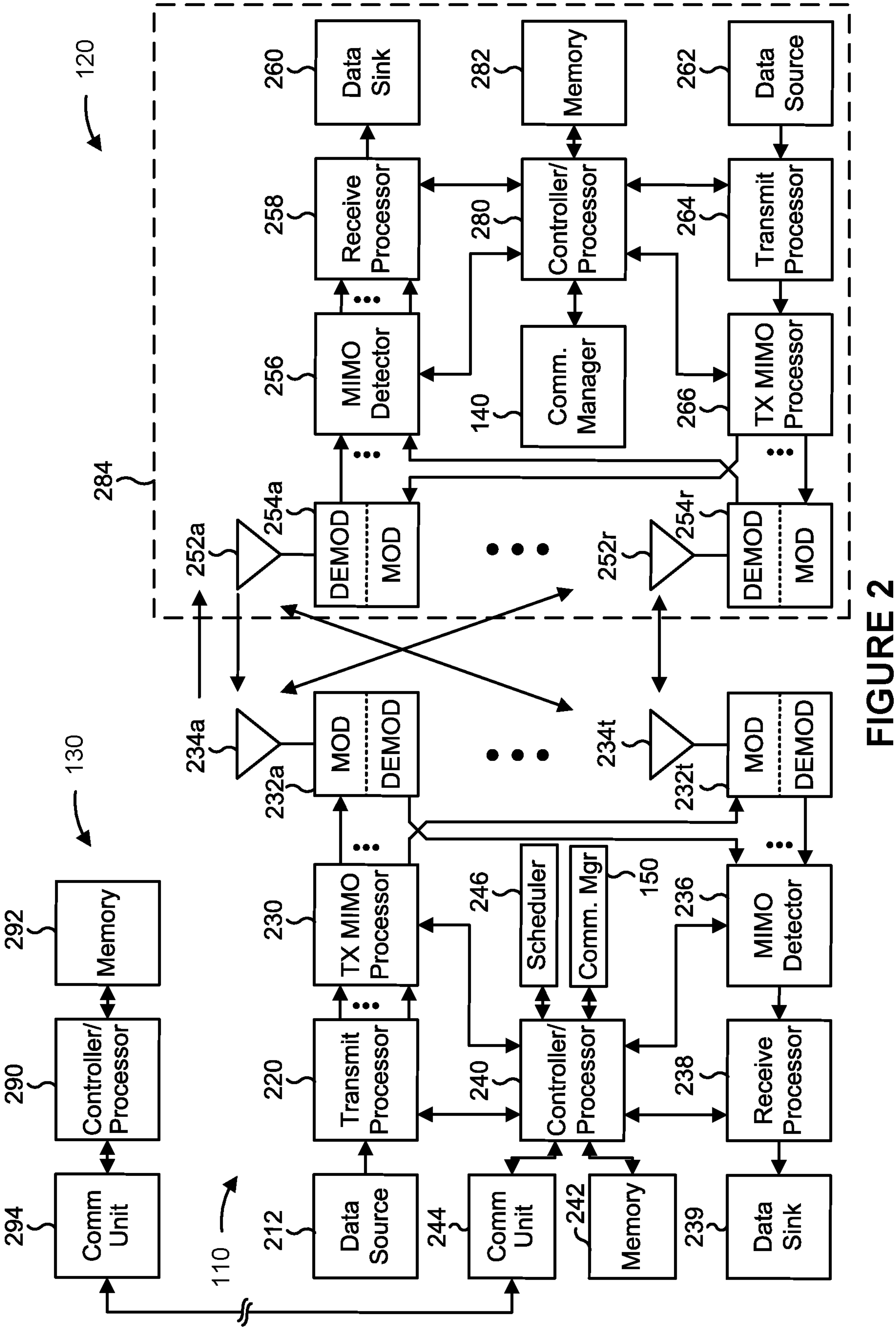
FIG. 2 is a diagram illustrating an example network node in communication with a user equipment (UE) in a wireless network in accordance with the present disclosure.

FIG. 2 is a diagram illustrating an example network node in communication with a UE in a wireless network in accordance with the present disclosure. The network node may correspond to the network node 110 of FIG. 1. Similarly, the UE may correspond to the UE 120 of FIG. 1. The network node 110 may be equipped with a set of antennas 234*a* through 234*t*, such as T antennas (T>1). The UE 120 may be equipped with a set of antennas 252*a* through 252*r*, such as R antennas (R>1). The network node 110 of depicted in FIG. 2 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232*a* through 232*t*. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232*a* through 232*t* may transmit a set of downlink signals (for example, T downlink signals) via a corresponding set of antennas 234 (for example, T antennas), shown as antennas 234*a* through 234*t*.

At the UE 120, a set of antennas 252 (shown as antennas 252*a* through 252*r*) may receive the downlink signals from the network node 110 or other network nodes 110 and may provide a set of received signals (for example, R received signals) to a set of modems 254 (for example, R modems), shown as modems 254*a* through 254*r*. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234*a* through 234*t* or antennas 252*a* through 252*r*) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the network node 110, the controller/processor 280 of the UE 120, or any other component(s) of FIG. 2 may perform one or more techniques associated with a priority based channel access procedure for sidelink communications, as described in more detail elsewhere herein. For example, the controller/processor 240 of the network node 110, the controller/processor 280 of the UE 120, or any other component(s) of FIG. 2 may perform or direct operations of, for example, process 1000 of FIG. 10, process 1100 of FIG. 11, process 1200 of FIG. 12, or other processes as described herein. The memory 242 and the memory 282 may store data and program codes for the network node 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 1000 of FIG. 10, process 1100 of FIG. 11, process 1200 of FIG. 12, or other processes as described herein. In some examples, executing instructions may include running the instructions, converting the instructions, compiling the instructions, or interpreting the instructions, among other examples.

In some aspects, the network node 110 includes means for receiving, from a UE (for example, UE 120), an indication of a QoS parameter associated with a sidelink communication; means for mapping the QoS parameter to an SL CAPC associated with a sidelink channel access procedure for the sidelink communication; or means for transmitting, to the UE, an indication of the SL CAPC associated with the sidelink channel access procedure for the sidelink communication. In some aspects, the means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the UE 120 includes means for performing a sidelink channel access procedure associated with a sidelink channel based at least in part on an SL CAPC associated with a QoS parameter associated with a sidelink communication; or means for transmitting, to another UE, the sidelink communication via the sidelink channel based at least in part on the sidelink channel access procedure. In some other aspects, the UE 120 includes means for receiving, from another UE, an indication of an SL CAPC associated with a QoS parameter associated with a sidelink communication; means for performing a sidelink channel access procedure associated with a sidelink channel based at least in part on the SL CAPC; or means for transmitting, to the other UE, the sidelink communication via the sidelink channel based at least in part on the sidelink channel access procedure. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (for example, an aggregated network node) may be configured to utilize a radio protocol stack that is physically or logically integrated within a single RAN node (for example, within a single device or unit). A disaggregated base station (for example, a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
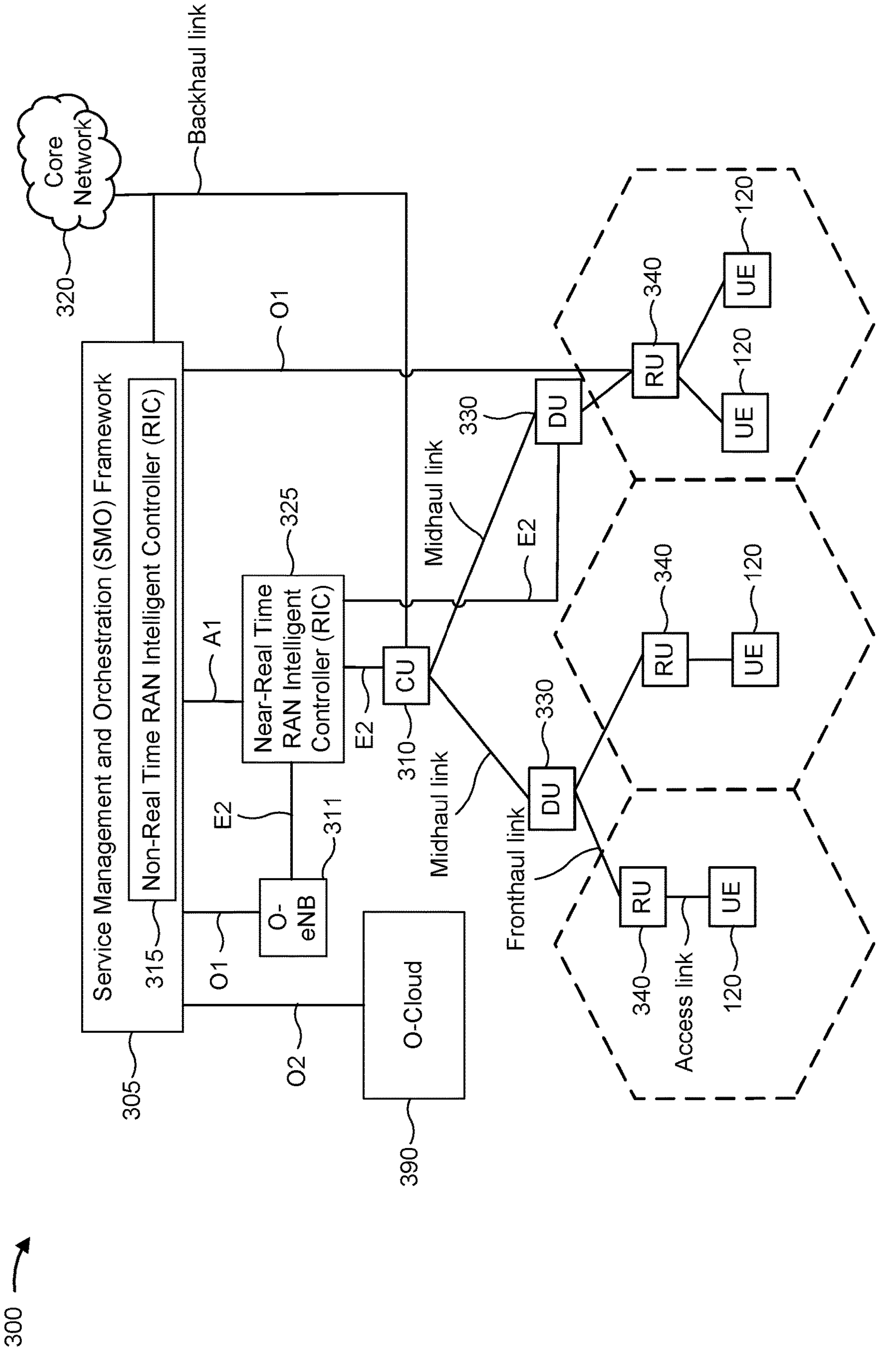
FIG. 3 is a diagram illustrating an example disaggregated base station architecture in accordance with the present disclosure.

FIG. 3 is a diagram illustrating an example disaggregated base station architecture 300 in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT MC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

Figure 4:
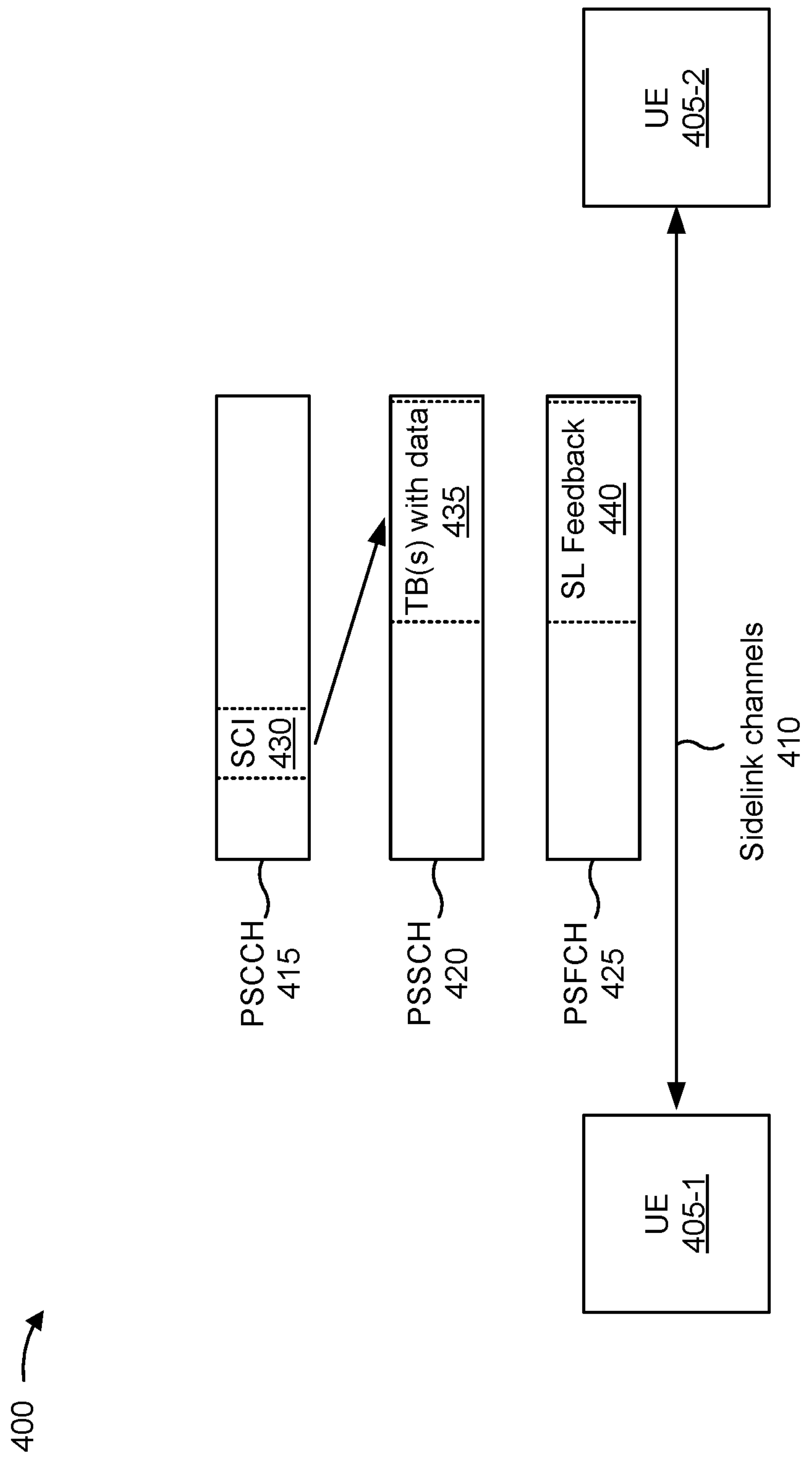
FIG. 4 is a diagram illustrating an example of sidelink communications in accordance with the present disclosure.

FIG. 4 is a diagram illustrating an example 400 of sidelink communications in accordance with the present disclosure.

As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (for example, which may include V2V communications, V2I communications, or V2P communications) or mesh networking. In some aspects, the UEs 405 (for example, UE 405-1 or UE 405-2) may correspond to one or more other UEs described elsewhere herein, such as UE 120. In some aspects, the one or more sidelink channels 410 may use a PC5 interface or may operate in a high frequency band (for example, the 5.9 GHz band). Additionally or alternatively, the UEs 405 may synchronize timing of transmission time intervals (TTIs) (for example, frames, subframes, slots, or symbols) using global navigation satellite system (GNSS) timing.

As further shown in FIG. 4, the one or more sidelink channels 410 may include a physical sidelink control channel (PSCCH) 415, a physical sidelink shared channel (PSSCH) 420, or a physical sidelink feedback channel (PSFCH) 425. The PSCCH 415 may be used to communicate control information, similar to a physical downlink control channel (PDCCH) or a physical uplink control channel (PUCCH) used for cellular communications with a network node 110 via an access link or an access channel. The PSSCH 420 may be used to communicate data, similar to a physical downlink shared channel (PDSCH) or a physical uplink shared channel (PUSCH) used for cellular communications with a network node 110 via an access link or an access channel. For example, the PSCCH 415 may carry sidelink control information (SCI) 430, which may indicate various control information used for sidelink communications, such as one or more resources (for example, time resources, frequency resources, or spatial resources) where a transport block (TB) 435 may be carried on the PSSCH 420. The TB 435 may include data. The PSFCH 425 may be used to communicate sidelink feedback 440, such as hybrid automatic repeat request (HARQ) feedback (for example, acknowledgement or negative acknowledgement (ACK/NACK) information).

Although shown on the PSCCH 415, in some aspects, the SCI 430 may include multiple communications in different stages, such as a first stage SCI (SCI-1) and a second stage SCI (SCI-2). The SCI-1 may be transmitted on the PSCCH 415. The SCI-2 may be transmitted on the PSSCH 420. The SCI-1 may include, for example, an indication of one or more resources (for example, time resources, frequency resources, or spatial resources) reserved for the PSSCH 420 in future, information for decoding sidelink communications on the PSSCH, a QoS priority value, a resource reservation period, a PSSCH DMRS pattern, an SCI format for the SCI-2, a beta offset for the SCI-2, a quantity of PSSCH DMRS ports, or a modulation and coding scheme (MCS). The SCI-2 may include information associated with data transmissions on the PSSCH 420, such as a HARQ process ID, a new data indicator (NDI), a source identifier, a destination identifier, or a channel state information (CSI) report trigger.

In some aspects, the one or more sidelink channels 410 may use resource pools. For example, a scheduling assignment (for example, included in SCI 430) may be transmitted in sub-channels using specific resource blocks (RBs) across time. In some aspects, data transmissions (for example, on the PSSCH 420) associated with a scheduling assignment may occupy RBs in the same subframe as the scheduling assignment (for example, using frequency division multiplexing).

In some aspects, a UE 405 may operate using a sidelink resource allocation mode (for example, Resource Allocation Mode 1, sometimes referred to herein as Mode 1) where resource selection or scheduling is performed by a network node 110 (for example, a base station, a CU, or a DU). For example, the UE 405 may receive a grant (for example, in downlink control information (DCI) or in an RRC message, such as for configured grants) from the network node 110 (for example, directly or via one or more network nodes) for sidelink channel access or scheduling. In some aspects, a UE 405 may operate using a resource allocation mode (for example, Resource Allocation Mode 2, sometimes referred to herein as Mode 2) where resource selection or scheduling is performed by the UE 405 (for example, rather than a network node 110). In some aspects, the UE 405 may perform resource selection or scheduling by sensing channel availability for transmissions. For example, the UE 405 may measure an RSSI parameter (for example, a sidelink-RSSI (S-RSSI) parameter) associated with various sidelink channels, may measure an RSRP parameter (for example, a PSCCH-RSRP or PSSCH-RSRP parameter) associated with various sidelink channels, or may measure an RSRQ parameter (for example, a PSCCH-RSRQ or PSSCH-RSRQ parameter) associated with various sidelink channels, and may select a channel for transmission of a sidelink communication based at least in part on the measurement(s).

Additionally or alternatively, the UE 405 may perform resource selection or scheduling using SCI 430 received in the PSCCH 415, which may indicate occupied resources or channel parameters. Additionally or alternatively, the UE 405 may perform resource selection or scheduling by determining a channel busy ratio (CBR) associated with various sidelink channels, which may be used for rate control (for example, by indicating a maximum quantity of resource blocks that the UE 405 can use for a particular set of subframes).

In the resource allocation mode where resource selection or scheduling is performed by a UE 405, the UE 405 may generate sidelink grants, and may transmit the grants in SCI 430. A sidelink grant may indicate, for example, one or more parameters (for example, transmission parameters) to be used for an upcoming sidelink transmission, such as one or more resource blocks to be used for the upcoming sidelink transmission on the PSSCH 420 (for example, for TB s 435), one or more subframes to be used for the upcoming sidelink transmission, or an MCS to be used for the upcoming sidelink transmission. In some aspects, a UE 405 may generate a sidelink grant that indicates one or more parameters for semi-persistent scheduling (SPS), such as a periodicity of a sidelink transmission. Additionally or alternatively, the UE 405 may generate a sidelink grant for event-driven scheduling, such as for an on-demand sidelink message.

Figure 5:
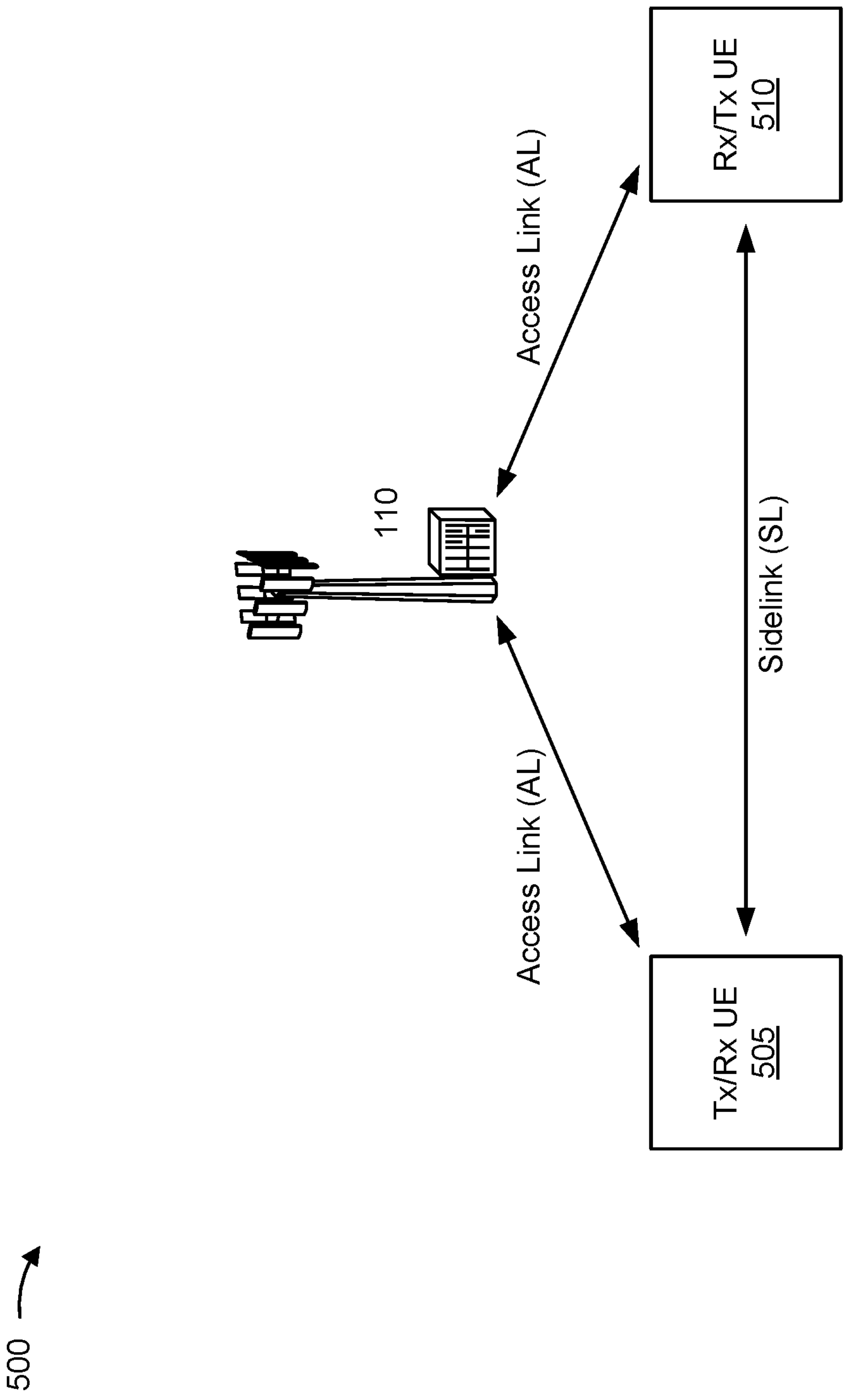
FIG. 5 is a diagram illustrating an example of sidelink communications and access link communications in accordance with the present disclosure.

FIG. 5 is a diagram illustrating an example 500 of sidelink communications and access link communications in accordance with the present disclosure.

As shown in FIG. 5, a transmitter (Tx)/receiver (Rx) UE 505 and an Rx/Tx UE 510 may communicate with one another via a sidelink, as described above in connection with FIG. 4. As further shown, in some sidelink modes, a network node 110 may communicate with the Tx/Rx UE 505 (for example, directly or via one or more network nodes), such as via a first access link. Additionally or alternatively, in some sidelink modes, the network node 110 may communicate with the Rx/Tx UE 510 (for example, directly or via one or more network nodes), such as via a first access link. The Tx/Rx UE 505 or the Rx/Tx UE 510 may correspond to one or more UEs described elsewhere herein, such as the UE 120 of FIG. 1 or one of the UEs 405-1, 405-2 of FIG. 4. Thus, a direct link between UEs 120 (for example, via a PC5 interface) may be referred to as a sidelink, and a direct link between a network node 110 and a UE 120 (for example, via a Uu interface) may be referred to as an access link. Sidelink communications may be transmitted via the sidelink, and access link communications may be transmitted via the access link. An access link communication may be either a downlink communication (from a network node 110 to a UE 120) or an uplink communication (from a UE 120 to a network node 110).

In some examples, the Tx/Rx UE 505 and the Rx/Tx UE 510 may communicate in an unlicensed frequency band, sometimes referred to as communicating in a sidelink unlicensed (SLU) mode. When communicating in an unlicensed frequency band, various wireless communication devices may be competing for use of overlapping time or frequency resources, leading to interfering signals, congested channels, and otherwise unreliable wireless communications. When a UE 120 and a network node 110 are communicating on an access link in an unlicensed frequency band, such as when operating in an NR unlicensed (NRU) mode, interfering communications may be reduced by the UE 120 or the network node 110 utilizing a priority based listen-before-talk (LBT) procedure, such as an LBT procedure associated with a channel access priority class (CAPC), to ensure a communication channel is free of competing communications. In such examples, each CAPC (sometimes referred to as p) may be associated with certain LBT parameters, such as a quantity of consecutive sensing slots related to a CAPC value p (sometimes referred to as $m_p$) associated with the LBT procedure, a minimum and maximum contention window parameter associated with a CAPC value p (sometimes referred to as $CW_{min,p}$ and $CW_{max,p}$, respectively), or a maximum COT associated with a CAPC value p (sometimes referred to as $T_{m\ cot,\ p}$). However, such LBT parameters are not associated with sidelink communications, and thus are not available for coordinating competing communications in SLU channels. Accordingly, UEs 120 communicating in an SLU mode may experience high interference levels, leading to degraded signals or radio link failure, high latency, low throughput, and otherwise inefficient usage of network resources.

Various aspects relate generally to priority based channel access procedures for sidelink communications occurring in a shared spectrum, such as in an unlicensed frequency band. Some aspects more specifically relate to mapping a QoS parameter associated with a sidelink communication to an SL CAPC. In some aspects, the SL CAPC may be associated with certain sidelink LBT parameters or similar sidelink channel access parameters for a sidelink channel or signal or a sidelink communication, such as a quantity of consecutive sensing slots associated with the SL CAPC for sidelink LBT channel access procedure, a minimum and maximum sidelink contention window associated with the SL CAPC, a maximum sidelink COT associated with the SL CAPC, or similar parameters. In some aspects, a Tx UE (for example, Tx/Rx UE 505) may signal, to a network node 110, an indication of a QoS parameter associated with the sidelink communication, and the network node 110 may map the QoS parameter to an SL CAPC and signal an indication of the SL CAPC to the Tx UE. In some other aspects, the Tx UE may map the QoS parameter to an SL CAPC absent signaling from the network node 110 (for example, the Tx UE may autonomously map the QoS parameter to an SL CAPC based at least in part on an SL CAPC mapping lookup table, among other examples). In either aspect, the Tx UE may signal the SL CAPC to one or more Rx UEs (for example, Rx/Tx UE 510) or may communicate with the one or more Rx UEs based at least in part on the channel access procedure associated with the SL CAPC.

Particular aspects of the subject matter described in this disclosure can be implemented to realize one or more of the following potential advantages. In some examples, the described techniques can be used to prioritize sidelink communications within an unlicensed frequency band, such that sidelink communications associated with high priority messages have improved access to reduced-interference channels, resulting in a reduction of communication errors and thus reduced power, computing, and network resource consumption that would have otherwise been required to correct communication errors. In some other examples, the described techniques can be used to schedule or otherwise coordinate competing communications within an unlicensed frequency band associated with sidelink communications, resulting in clearer communication channels and thus reduced latency, higher throughput, and overall more efficient utilization of network resources.

FIG. 6 is a diagram illustrating an example table 600 associated with a sidelink channel access priority class in accordance with the present disclosure.

In some aspects, SL CAPCs may be defined or specified for a priority based sidelink channel access procedure associated with a shared spectrum (for example, SLU). More particularly, multiple SL CAPCs may be associated with corresponding channel access parameters, and a sidelink channel or signal or a sidelink communication may be associated with (for example, specified, pre-configured, configured, activated or dynamically indicated with) at least an SL CAPC. When performing a channel access procedure, such as an LBT procedure, associated with the sidelink channel or signal or the sidelink communication, a UE 120 (for example, one of the Tx/Rx UE 505 or the Rx/Tx UE 510) may implement the associated channel access parameters to assess whether a channel is available (for example, whether the channel is being used by another UE 120 or device or is free for the UE 120 to transmit a sidelink communication).

More particularly, the table 600 may include a first column 602 including multiple SL CAPCs, sometimes referred to as sl_p. For example, in the depicted example the table includes four SL CAPCs, indexed 1 to 4, but, in some other aspects, a table may include more or less SL CAPCs without departing from the scope of the disclosure. Each SL CAPC (for example, each sl_p) may be associated with one or more channel access parameters, indicated by the remaining columns of the table 600.

For example, as shown in a second column 604, each SL CAPC may be associated with a corresponding quantity of consecutive sidelink sensing slots (sometimes referred to as $sl\_m_p$). More particularly, the first SL CAPC may be associated with 1 or 2 sidelink sensing slots, the second SL CAPC may be associated with 1 or 2 consecutive sidelink sensing slots, the third SL CAPC may be associated with 3 consecutive sidelink sensing slots, and the fourth SL CAPC may be associated with 7 consecutive sidelink sensing slots. The quantity of sidelink sensing slots may refer to a consecutive quantity of sidelink sensing slots during which a UE 120 should listen or sense for the frequency channel to be clear or idle. In the example depicted in FIG. 6, for SL CAPC 1, the UE 120 should not attempt to access the channel until the frequency channel is clear or idle for at least one slot (for example, $sl\_m_{sl\_p}=1$); for SL CAPC 2, the UE 120 should not attempt to access the channel until the frequency channel is clear or idle for at least two consecutive slots (for example, $sl\_m_{sl\_p}=2$); and so forth. In some aspects, a channel may be declared available during the sensing period if energy received during the consecutive sensing slots is below a threshold.

Once the channel has been declared available during the quantity of consecutive sidelink sensing slots, the UE 120 may wait a back-off period, during which the UE 120 waits a random period of time to listen for other UEs 120 using the channel. In some aspects, the back-off period may be associated with a contention window (sometimes referred to as $CW_{sl\_p}$). A size of the contention window may selected from a list of allowed sidelink contention window sizes (sometimes referred to as $sl\_CW_{sl\_p}$), indicated in the sixth column 612 of table 600, which may be between a minimum sidelink contention window size (sometimes referred to as $sl\_CW_{min,sl\_p}$), indicated in the third column 606 of the table 600, and a maximum sidelink contention window size (sometimes referred to as $sl\_CW_{max,sl\_p}$), indicated in the fourth column 608 of the table 600. For example, SL CAPC 1 may be associated with a contention window size between 3 and 7, and may be selected from the list of {3, 7}. SL CAPC 2 may be associated with a contention window size between 7 and 15, and may be selected from the list of {7, 15}. SL CAPC 3 may be associated with a contention window size between 15 and 1023, and may be selected from the list of {15, 31, 63, 127, 255, 511, 1023}. Similarly, SL CAPC 4 may be associated with a contention window size between 15 and a maximum contention window size of 1023, and may selected from the list of {15, 31, 63, 127, 255, 511, 1023}.

During a channel access procedure (for example, a LBT procedure), a UE 120 may declare a channel available (and thus available for transmitting a sidelink communication) if energy received during the back-off period associated with the contention window is below a threshold. More particularly, a UE 120 may initially set a back-off counter, N, to $N_{init}$, which may be a random number uniformly distributed between 0 and $CW_{sl\_p}$. Anytime N is equal to zero, the UE 120 may cease the back-off period and thus determine that the channel is available for a sidelink transmission. Thus, if N is randomly set to 0 initially, the UE 120 may immediately access the channel. If N is not initially equal to zero, the UE 120 may decrease the counter by one (for example, the UE 120 may set N=N−1), and sense the channel for a slot duration. If, during the slot duration, the channel is idle, the UE 120 may stop the back-off period and access the channel if N=0, or else may decrease the counter by 1 (for example, set N=N−1) and continue in a like manner as described above until N=0 (for example, the UE 120 may sense the channel for additional slot durations until N=0). Whenever the channel is sensed busy during the above procedure, the UE 120 may put the back-off timer on hold until the channel is idle for a period of time (for example, corresponding to the quantity of consecutive sensing slots, $sl\_m_{sl\_p}$), at which point the UE 120 may proceed in the manner described above (for example, set $N=N_{init}$ and attempt to sense an idle channel for the back-off period duration). Accordingly, the larger the contention window, the larger average back-off period, and thus the lower likelihood of collisions in the unlicensed channel. Thus, a smaller contention window may be used for high-priority communications (for example, communications having a low SL CAPC value, such as 1 or 2), to gain faster access to a channel, while a larger contention window may be used for lower priority communications (for example, communications having a higher SL CAPC value, such as 3 or 4) to increase the likelihood of low-priority data being transmitted.

Moreover, as shown in a fifth column 610 of the table 600, each SL CAPC may be associated with a corresponding maximum sidelink COT (sometimes referred to as $sl\_T_{m\,cot,sl\_p}$). A sidelink COT may refer to the total time for a UE 120 (and, if applicable, any UEs 120 sharing the channel occupancy) to share the channel occupancy to perform transmission(s) on a channel after a UE 120 performs the corresponding channel access procedure to acquire the channel, such as the channel access procedure described above. In some aspects, and as shown in the fifth column, SL CAPC 1 may be associated with a maximum sidelink COT of 2 milliseconds (ms), SL CAPC 2 may be associated with a maximum sidelink COT of 4 ms, SL CAPC 3 may be associated with a maximum sidelink COT of one of 8 or 10 ms (depending on the particular configuration), and SL CAPC 4 may be associated with a maximum sidelink COT of one of 8 or 10 ms (depending on the particular configuration).

In some aspects, each sidelink channel or signal may be specified (for example, defined by a wireless communication standard, such as a standard promulgated by the 3GPP), pre-configured, configured, activated, or dynamically indicated with an SL CAPC, or a corresponding SL CAPC may be determined (for example, by a network node 110 for a Mode 1 transmissions or by a UE 120 for a Mode 1 or a Mode 2 transmissions). For example, in some aspects, for a sidelink synchronization signal block (S-SSB) communication, one or more SL CAPCs associated with the S-SSB may be specified, pre-configured, configured, or activated. Moreover, in some aspects, a default value of an SL CAPC for an S-SSB communication (for example, a value associated with an S-SSB communication absent a contrary configuration or activation) may be equal to 1 (for example, sl_p=1).

For a physical sidelink feedback channel (PSFCH) communication, such as a sidelink HARQ ACK or NACK feedback or sidelink CSI report, one or more SL CAPCs associated with the PSFCH communication may be specified, pre-configured, configured, activated, or dynamically indicated. Moreover, a default value of an SL CAPC for a PSFCH communication may be 1 or 2 (for example, sl_p=1 or sl_p=2). In some other aspects, one or more SL CAPC values associated with a PSFCH communication may be determined (for example, by a network node 110 for a Mode 1 transmission or by a UE 120 for a Mode 1 or a Mode 2 transmission) based at least in part on a priority value associated with a feedback message carried by the PSFCH communication (described in more detail below in connection with FIG. 7). In some other aspects, one or more SL CAPC values associated with a PSFCH communication may be determined (for example, by a network node 110 for a Mode 1 transmission or by a UE 120 for a Mode 1 or a Mode 2 transmission) based at least in part on a format of the PSFCH communication. For example, a 1-bit PSFCH feedback communication may be associated with SL CAPC 1, and a multi-bit PSFCH feedback communication may be associated with SL CAPC 2.

For a physical sidelink shared channel (PSSCH) communication, a corresponding SL CAPC may be based at least in part on a type of message transmitted via the PSSCH. For example, for a PSSCH communication associated with a sidelink discovery message for peer discovery (for example, an NR V2X communication, or an NR proximity service (ProSe) communication), or else a communication associated with a sidelink discovery message for a relay discovery (for example, a UE-to-network relay or a UE-to-UE relay) (sometimes referred to as a PSSCH discovery communication), one or more SL CAPC values may be associated with a resource pool for discovery message or communication (for example, a dedicated or shared resource pool for discovery), or may be specified, pre-configured, configured, or activated. Moreover, a default SL CAPC associated with a PSSCH discovery communication may be 2 or 3 (for example, sl_p=2 or sl_p=3). In some other aspects, one or more SL CAPC values associated with a PSSCH discovery communication may be determined (for example, by a network node 110 for a Mode 1 transmission or by a UE 120 for a Mode 1 or a Mode 2 transmission) based at least in part on a priority value associated with a discovery message carried by the PSSCH discovery communication (described in more detail below in connection with FIG. 7) or based at least in part on a latency value associated with a discovery message carried by the PSSCH discovery communication or based on at least in part on a resource pool (dedicated or shared resource pool) associated with a discovery message carried by the PSSCH discovery communication.

For a PSSCH communication associated with a PC5 control message (for example, a PC5-S or PC5 RRC message) (sometimes referred to as a PSSCH PC5 control communication), one or more SL CAPC values may be specified, pre-configured, configured. or activated for a sidelink control logical channel associated with the PSSCH PC5 control communication. Moreover, a default value of an SL CAPC associated with a PSSCH PC5 control communication may be 2 or 3 (for example, sl_p=2 or sl_p=3). In some other aspects, one or more SL CAPC values associated with a PSSCH PC5 control communication may be determined (for example, by a network node 110 for a Resource Allocation Mode 1 or by a UE 120 505 for a Resource Allocation Mode 1 or a Mode 2) based at least in part on a priority value or a latency value associated with a logical channel associated with the PSSCH PC5 control communication, or a highest priority value or lowest latency value associated with the PSSCH PC5 control communication if more than one priority or latency value.

For a PSSCH communication associated with one or more standalone MAC control elements (MAC-CEs) (without data multiplexed) (for example, containing at least one of a CSI MAC-CE, an inter-UE coordination (IUC) MAC-CE, or a sidelink discontinuous reception (DRX) command MAC-CE, among other examples) (sometimes referred to as a PSSCH MAC-CE communication), one or more SL CAPC values may be specified, pre-configured, configured, activated, or dynamically indicated. Moreover, a default value of an SL CAPC associated with a PSSCH MAC-CE communication may be 1 or 2 (for example, sl_p=1 or sl_p=2) for a CSI MAC CE, may be 1, 2, or 3 (for example, sl_p=1, sl_p=2, or sl_p=3) for an IUC request MAC CE or an IUC information MAC CE, or may be 2 or 3 (for example, sl_p=2 or sl_p=3) for a sidelink DRX command MAC-CE. Additionally or alternatively, one or more SL CAPC values associated with a PSSCH MAC-CE communication may be determined (for example, by a network node 110 for a Mode 1 transmission or by a UE 120 for a Mode 1 or a Mode 2 transmission) based at least in part on a priority value or a latency value (for example, upper bound latency) associated with a sidelink CSI report using a CSI MAC-CE, or based at least in part on a priority value, latency value, or packet delay budget (PDB) associated with an IUC request MAC CE or IUC information MAC-CE. For a non-standalone PSSCH MAC-CE communication (for example, a MAC-CE multiplexed with data), one or more SL CAPC values may be determined (for example, by a network node 110 for a Mode 1 transmission or by a UE 120 for a Mode 1 or a Mode 2 transmission) based at least in part on a highest priority level or lowest latency level associated with data logical channel(s) and the MAC-CE(s).

For a PSSCH communication carrying data (sometimes referred to herein as a PSSCH data communication), one or more SL CAPC values may be specified, pre-configured, or configured. Moreover, a default value of an SL CAPC associated with a PSSCH data communication may be 2 or 3 (for example, sl_p=2 or sl_p=3). In some aspects, a default value may be 2 or 3 based at least in part on one or more QoS parameters associated with the PSSCH data communication, such as a QoS parameter associated with an NR V2X communication, an NR ProSe communication, or a similar sidelink data communication. Additionally or alternatively, one or more SL CAPC values associated with a PSSCH data communication may be determined (for example, by a network node 110 for a Mode 1 transmission or by a UE 120 for a Mode 1 or a Mode 2 transmission) based at least in part on one or more QoS parameters associated with a sidelink communication. For example, in some aspects, one or more SL CAPC values associated with a PSSCH data communication may be determined based at least in part on a destination identifier for a groupcast or broadcast sidelink communication, based at least in part on a pair of a source identifier and a destination identifier or a link identifier for a unicast communication. In some other aspects, one or more SL CAPC values associated with a PSSCH data communication may be determined dynamically for each data packet transmitted based at least in part on one or more QoS parameters associated with a corresponding data packet.

In some aspects, one or more QoS parameters associated with a sidelink channel or a sidelink communication may be mapped to one of the SL CAPCs, thereby defining the parameters associated with a channel access procedure when a UE 120 accesses an unlicensed channel for purposes of transmitting a sidelink communication. Aspects of mapping one or more QoS parameters to an SL CAPC are described in more detail below in connection with FIGS. 7-9.

FIG. 7 is a diagram illustrating example tables 700, 702 associated with mapping a sidelink channel access priority class to another priority class associated with a sidelink communication in accordance with the present disclosure.

In some aspects, a sidelink communication, which may be a broadcast communication, a groupcast communication, or a unicast communication transmitted over a sidelink, may be associated with one or more QoS parameters (sometimes referred to as one or more PC5 QoS parameters). In some aspects, an upper layer of a UE 120 (for example, Tx/Rx UE 505), such as a V2X layer, a ProSe layer, or another upper layer, may determine one or more QoS parameters based at least in part on a sidelink application's performance requirement, or based at least in part on mapping of a sidelink service or application (such as a V2X service type or ProSe identifier) to a QoS parameter, among other examples.

In some aspects, PC5 QoS parameters may include one or more PC5 NR standardized QoS identifiers (PQIs). A PQI may refer to an identifier (for example, a scalar value) that refers to specific PC5 QoS characteristics associated with sidelink services or applications. In some aspects, standardized PQI values may be defined for certain sidelink services, such as V2X services or ProSe services. In some aspects, a PQI identifies characteristics with a QoS profile for a sidelink communication or service and the PQI may control how packets are managed from a QoS perspective. Some characteristics associated with a PQI may include a resource type associated with a sidelink communication or service, a priority level associated with a sidelink communication or service, a PDB associated with a sidelink communication or service, a packet error rate (PER) associated with a sidelink communication or service, an averaging window associated with a sidelink communication or service, or a maximum data burst volume (MDBV) associated with a sidelink communication or service, among other examples. Additionally or alternatively, PC5 QoS parameters may include other parameters such as PC5 flow bit rates, PC5 link aggregated bit rates, or range (for example, a communication range associated with a QoS requirement), among other examples.

In some aspects, one or more standardized PQI values, priority values, or similar values may be mapped to an SL CAPC for purposes of performing a sidelink channel access procedure, such as a sidelink LBT procedure, among other examples. For example, table 700 shows one example of an SL CAPC mapping lookup table in accordance with aspects of the disclosure. An SL CAPC mapping lookup table, such as table 700, may be specified, pre-configured at a UE 120, configured at the UE 120 (for example, via RRC signaling from a serving network node 110 on Uu interface or PC5 RRC signaling from a UE 120 on PC5 interface), or may be activated/deactivated at the UE 120 (for example, via one or more MAC-CEs from a serving network node 110 on Uu interface or PC5 MAC-CEs from a UE 120 on PC5 interface or one or more DCIs from a serving network node 110 on Uu interface or SCIs from a UE 120 on PC5 interface). As shown in table 700, each SL CAPC (indicated in a first column 704) may be mapped to one or more QoS parameters, such as one or more V2X service PQIs (indicated in a second column 706), one or more V2X service priority levels (indicated in a third column 708), one or more ProSe service PQIs (indicated in a fourth column 710), or one or more ProSe service priority levels (indicated in a fifth column 712). For example, SL CAPC 1 may be mapped to a V2X PQI of 91 or a V2X priority level of 2 for a V2X service or application, a ProSe PQI of one of the list of {24, 60} or a ProSe priority level of 1 for a ProSe service or application. SL CAPC 2 may be mapped to a V2X PQI of one of the list of {21, 23, 55, 90} or a V2X priority level of 3 for a V2X service or application, a ProSe PQI of one of the list of {25, 26} or a ProSe priority level of 2 for a ProSe service or application. SL CAPC 3 may be mapped to a V2X PQI of one of the list of {22, 58} or a V2X priority level of 4 for a V2X service or application. And SL CAPC 4 may be mapped to a V2X PQI of 57 or one of the list of {56, 59} or a V2X priority level of 5 or 6 for a V2X service or application, a ProSe PQI of 92 or one of the list of {61, 93} or a ProSe priority level of 5 or 6 for a ProSe service or application.

In some other aspects, one or more Layer 1 priority values may be mapped to an SL CAPC for purposes of performing a sidelink channel access procedure, such as a sidelink LBT procedure, among other examples. More particularly, each PSSCH transmission may be associated with a sidelink Layer 1 priority value. In some aspects, the sidelink Layer 1 priority value may be a 3-bit priority value indicated by SCI associated with a PSSCH transmission, and may include a value of 0-7. In some aspects, a sidelink Layer 1 priority level associated with PSSCH transmission may be based at least in part on one or more priority levels associated with a QoS parameter from an upper layer, such as one of the QoS parameters described above in connection with Table 700.

In some aspects, as shown by table 702, one or more Layer 1 priority values may be mapped each SL CAPC. That is, table 702 shows another example of an SL CAPC mapping lookup table in accordance with aspects of the disclosure. As shown in table 702, each SL CAPC (indicated in a first column 714) may be mapped to one or more QoS parameters, such as one or more sidelink Layer 1 priority values (indicated in a second column 716). For example, SL CAPC 1 may be mapped to a sidelink Layer 1 priority value of 1 or one of the list of {1, 2}. SL CAPC 2 may be mapped to a sidelink Layer 1 priority value of one of the list of {2, 3} or one of the list of {3, 4}. SL CAPC 3 may be mapped to a sidelink Layer 1 priority value of one of the list of {4, 5} or one of the list of {5, 6}. And SL CAPC 4 may be mapped to a sidelink Layer 1 priority value of one of the list of {6, 7, 8}, or one of the list of {7, 8}.

In some aspects, one or more of the SL mapping lookup tables may be used by a network node 110 or a UE 120 (for example, Tx/Rx UE 505) to determine an SL CAPC associated with a sidelink channel access procedure for a sidelink communication. For example, a network node 110 or a UE 120 may map a QoS parameter associated with a sidelink communication to an SL CAPC using one of the above-described mapping lookup tables, and the UE 120 may thus perform a sidelink channel access procedure (for example, a sidelink LBT procedure) associated with an unlicensed frequency band or other shared spectrum based at least in part on the SL CAPC and the channel access parameters associated therewith, as described above in connection with FIG. 6 (for example, a corresponding quantity of consecutive sidelink sensing slots, $sl\_m_p$; a corresponding sidelink contention window, $sl\_CW_{sl\_p}$; a corresponding list of allowed sidelink contention window sizes, $sl\_CW_{sl\_p}$; a corresponding minimum sidelink contention window size, $sl\_CW_{min,sl\_p}$; or a corresponding maximum sidelink contention window size, $Sl\_CW_{max,sl\_p}$). Aspects of mapping one or more QoS parameters to one or more SL CAPCs are described in more detail below in connection with FIGS. 8-9.

Figure 8:
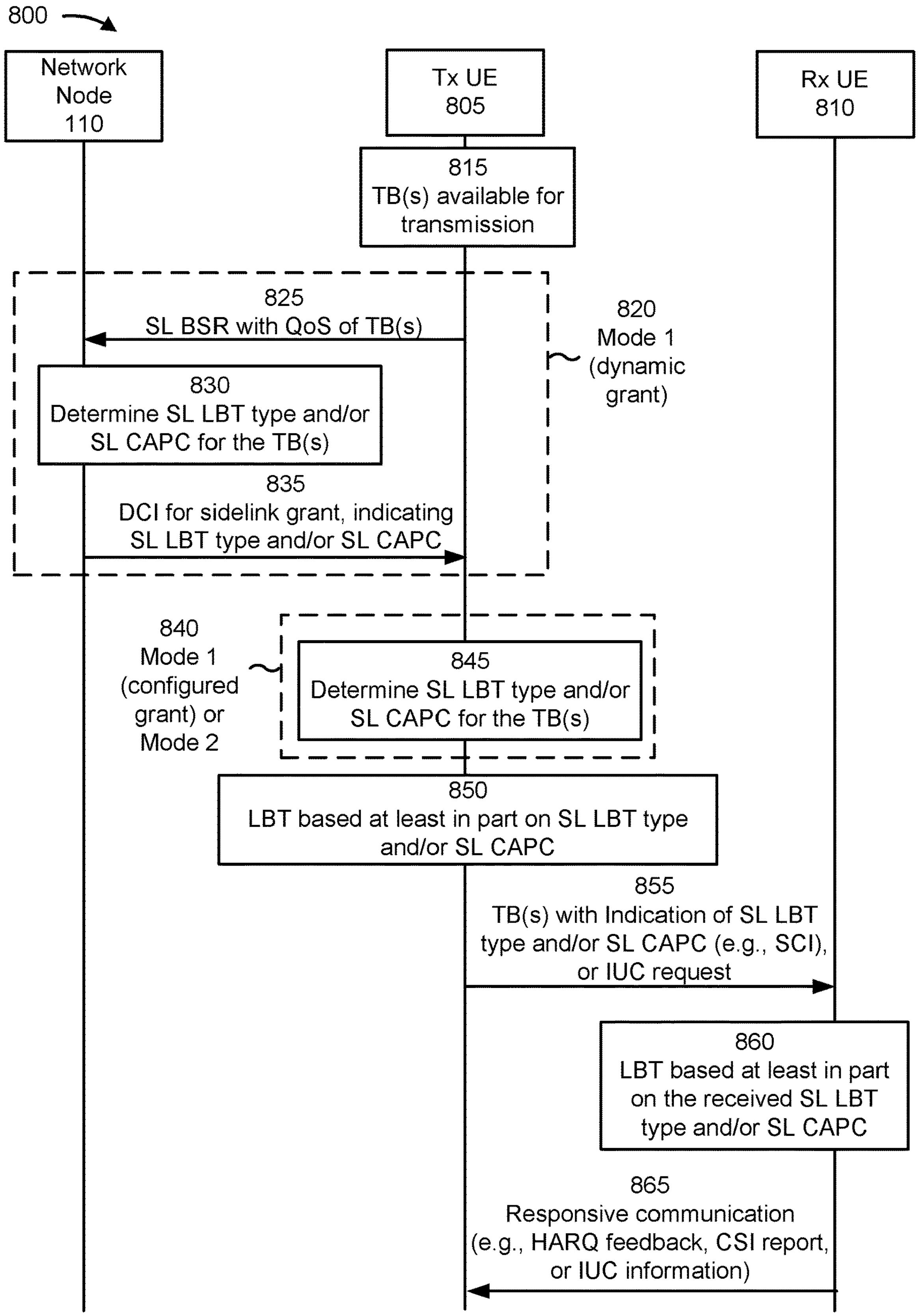
FIG. 8 is a diagram of an example associated with a sidelink listen-before-talk operation associated with a sidelink channel access priority class in accordance with the present disclosure.

FIG. 8 is a diagram of an example 800 associated with a sidelink listen-before-talk operation associated with a sidelink channel access priority class in accordance with the present disclosure. As shown in FIG. 8, a network node 110, a Tx UE 805 (for example, UE 120, UE 405-1, UE 405-2, Tx/Rx UE 505, or Rx/Tx UE 510), and an Rx UE 810 (for example, UE 120, UE 405-1, UE 405-2, Tx/Rx UE 505, or Rx/Tx UE 510) may communicate with one another. In some aspects, the network node 110, the Tx UE 805, and the Rx UE 810 may be part of a wireless network (for example, wireless network 100). The network node 110, the Tx UE 805, and the Rx UE 810 may have established a wireless connection prior to operations shown in FIG. 8. For example, the network node 110 and the Tx UE 805 may have established a connection via an access link (for example, a Uu interface) as described in connection with FIG. 5, the network node 110 and the Rx UE 810 may have established a connection via another access link, or the Tx UE 805 and the Rx UE 810 may have established a connection via a sidelink (for example, a PC5 interface) as described in connection with FIG. 5. In some aspects, the network node 110 may have established a connection with the Tx UE 805 but not the Rx UE 810 (for example, the Rx UE 810 may be an out-of-coverage UE or under another network node's coverage).

In a first operation 815, the Tx UE 805 may receive, from an upper layer, one or more TBs (for example, TBs 435) associated with a sidelink communication (for example, associated with a communication to be transmitted to the Rx UE 810 via the sidelink). In some aspects, the one or more TBs may be associated with one or more QoS profiles or QoS parameters, such as one or more of the QoS parameters described above in connection with FIG. 7 (for example, a PQI, a priority level, a PDB, or a similar QoS parameter associated to a QoS profile).

In some aspects, one or more QoS parameters associated with the one or more TBs of a sidelink communication or service may be mapped to an SL CAPC for purposes of performing a channel access procedure associated with a sidelink channel used to transmit the one or more TBs, which may be an SLU channel or a similar shared spectrum channel. For Mode 1 transmissions, the network node 110 (for example, dynamic grant for resource allocation mode 1 when the Tx UE is at RRC Connected state with the network node 110) or the Tx UE 805 (for example, configured grant for resource allocation mode 1 when the Tx UE is at RRC Inactive or Idle state with the network node 110) may perform the mapping, while for Mode 2 transmissions (for example, either in or out of the coverage of the network node 110), the Tx UE 805 may perform the mapping.

For example, a second operation 820 shows an operation associated with a Mode 1 dynamic grant transmission in which the network node 110 performs the mapping between a QoS parameter associated with a sidelink communication and an SL CAPC. In such aspects, in a third operation 825, the Tx UE 805 may transmit, and the network node 110 may receive, an indication of a QoS parameter associated with a sidelink communication. For example, the Tx UE 805 may transmit a sidelink buffer status report (SL BSR) message or a sidelink UE information message, which may indicate the QoS parameter (for example, PQI, Priority Level or Layer 1 priority as described above in connection with FIG. 7) associated with the one or more TBs of a sidelink communication (for example, associated to a destination identifier for a broadcast or groupcast or a pair of source identifier and destination identifier or a link identifier for a unicast).

In a fourth operation 830, the network node 110 may determine an SL CAPC associated with a sidelink channel access procedure for the sidelink communication. For example, the network node 110 may determine the SL CAPC via mapping the received QoS parameter to an SL CAPC using one of the mapping lookup tables described above in connection with FIG. 7. For another example, the network node 110 may determine an SL CAPC based on at least one of sidelink channel status (for example, a channel congestion measurement such as CBR or RSRP or RSSI), sidelink LBT performance (for example, LBT success or failure count or rate or UE consistent LBT failure count), or received QoS parameter associated to the TB(s) to be transmitted, for example, using a mapping rule or mapping table with the combination of sidelink channel status (or sidelink LBT performance) and the QoS parameter associated to the TB(s) for both system performance and QoS requirement for both system performance and QoS requirement (for example, mapping the QoS parameter to an SL CAPC with a channel status based on the level of CBR or RSRP or RSSI measurement or mapping the QoS parameter to an SL CAPC with a sidelink LBT performance based on UE's LBT success or failure count or rate or UE consistent LBT failure count). Additionally or alternatively, in the fourth operation 830 the network node 110 may determine a sidelink LBT mode associated with the sidelink channel access procedure. In some aspects, a sidelink LBT mode may be one of Type 1 sidelink LBT mode or Type 2 sidelink LBT mode. In a Type 1 sidelink LBT mode, UEs 120 communicating on the sidelink may not have a COT associated with the channel access procedure (for example, $sl\_T_{m\ cot,sl\_p}$) to share for its sidelink channel accessing. In contrast, for a Type 2 sidelink LBT mode, UEs 120 communicating on the sidelink may have a COT associated with the channel access procedure to share for its sidelink channel accessing which allows UEs 120 to reduce the overhead of sidelink LBT procedure.

In a fifth operation 835, the network node 110 may transmit, and the Tx UE 805 may receive, an indication of the SL CAPC associated with the sidelink channel access procedure for the sidelink communication. Moreover, in aspects in which the network node 110 determined a sidelink LBT mode associated with the sidelink channel access procedure, in the fifth operation 835 the network node 110 may transmit, and the Tx UE 805 may receive, an indication of the sidelink LBT mode. In some aspects, the network node 110 may transmit the indication of the SL CAPC or the indication of the sidelink LBT mode via a DCI communication. For example, in some aspects the network node 110 may transmit the indication of the SL CAPC or the indication of the sidelink LBT mode via a sidelink grant communication transmitted via DCI on a PDCCH.

A sixth operation 840 shows an operation associated with a Mode 1 configured grant transmission, or else a Mode 2 transmission, in which the Tx UE 805 may determine a SL CAPC for the TB(s) to be transmitted. In some aspects, the Tx UE 805 may determine an SL CAPC for the TB(s) to be transmitted via the mapping between a QoS parameter associated with sidelink communication (for example, associated with the one or more TBs) and an SL CAPC. In some aspects, the Tx UE 805 may determine an SL CAPC based on at least one of sidelink channel status (for example, channel congestion measurement such as CBR or RSRP or RSSI), sidelink channel accessing performance (for example, LBT success or failure count or rate or UE consistent LBT failure count), or received QoS parameter associated to the TB(s) to be transmitted, for example, using a mapping rule or mapping table with the combination of sidelink channel status (or sidelink LBT performance) and the QoS parameter associated to the TB(s) for both system performance and QoS requirement (for example, mapping the QoS parameter to an SL CAPC with a channel status based on the level of CBR or RSRP or RSSI measurement or mapping the QoS parameter to an SL CAPC with a sidelink LBT performance based on UE's LBT success or failure count or rate or UE consistent LBT failure count). In such aspects, in a seventh operation 845, the Tx UE 805 may map the QoS parameter to the SL CAPC. For example, the Tx UE 805 may map the QoS parameter to the SL CAPC using one of the mapping lookup tables described above in connection with FIG. 7. Additionally or alternatively, in the sixth operation 840 the Tx UE 805 may determine a sidelink LBT mode associated with the sidelink channel access procedure. As described above in connection with the fourth operation 830, the sidelink LBT mode may be one of a Type 1 sidelink LBT mode (for example, without UE COT sharing) or Type 2 sidelink LBT mode (for example, with UE COT sharing).

Once the Tx UE 805 has received an indication of the SL CAPC from the network node 110, as described in connection with the second operation 820, or else has mapped the QoS parameter to the SL CAPC, as described in connection with the sixth operation 840, the Tx UE 805 may perform a channel access procedure, such as a sidelink LBT procedure. More particularly, in an eighth operation 850, Tx UE 805 may perform a sidelink channel access procedure associated with a sidelink channel based at least in part on the SL CAPC associated with the QoS parameter associated with the sidelink communication. Moreover, in aspects in which the network node 110 or the Tx UE 805 determined LBT mode associated with the sidelink channel access procedure, performing the sidelink channel access procedure may be further based at least in part on the sidelink LBT mode.

After completing a successful channel access procedure (for example, after acquiring a channel in an unlicensed frequency band or other shared spectrum based at least in part on the SL CAPC or the sidelink LBT mode, as described above in connection with FIG. 6), the Tx UE 805 may transmit one or more sidelink communications to one or more other UEs, such as the Rx UE 810. More particularly, in a ninth operation 855, the Tx UE 805 may transmit, and the Rx UE 810 may receive, the sidelink communication via the sidelink channel based at least in part on the sidelink channel access procedure. In some aspects, the sidelink communication transmitted in the ninth operation 855 may include the one or more TBs transmitted via PSSCH. Additionally or alternatively, the sidelink communication may include an indication of the SL CAPC associated with the sidelink communication or an indication of the sidelink LBT mode associated with the channel access procedure. For example, in some aspects, one or both of the SL CAPC or the sidelink LBT mode may be indicated via SCI (for example, SCI 430), such as via SCI-2. In some other aspects, the sidelink communication transmitted in the ninth operation 855 may be associated with an IUC request, such as an IUC request MAC CE transmitted with data (non-standalone) or without data (standalone) via a PSSCH. In such aspects, the IUC request may include an indication of at least one of the SL CAPC or the sidelink LBT mode associated with the sidelink channel access procedure, which may be indicated via SCI (for example, SCI 430), such as via SCI-2.

In a tenth operation 860, the Rx UE 810 may perform a sidelink channel access procedure associated with a sidelink channel based at least in part on the received SL CAPC or SL LBT mode. For example, in some aspects, the Rx UE 810 may perform a sidelink LBT procedure based at least in part on the sidelink LBT mode (for example, a Type 1 sidelink LBT mode without UE COT sharing or a Type 2 sidelink LBT mode with COT sharing), and the associated SL CAPC. In some aspects, the SL CAPC or sidelink LBT mode used by the Rx UE 810 may be associated with a responsive communication to be transmitted by the Rx UE 810 to the Tx UE 805 via the sidelink channel. For example, when the Rx UE 810 received a data transmission from the Tx UE 805, the SL CAPC or sidelink LBT mode may be an SL CAPC or sidelink LBT mode associated with a HARQ feedback communication on PSFCH (for example, PSFCH 425), or an SL CAPC or sidelink LBT mode associated with a CSI report transmitted using a MAC-CE. When the Rx UE 810 received IUC request from the Tx UE 805, the SL CAPC or sidelink LBT mode may be an SL CAPC or sidelink LBT mode associated with IUC communication transmitted using a MAC-CE.

In an eleventh operation 865, the Rx UE 810 may transmit a responsive communication using a sidelink channel accessed via a sidelink channel access procedure (for example, a sidelink LBT procedure associated with the SL CAPC or the sidelink LBT mode). More particularly, the Rx UE 810 may transmit, and the Tx UE 805 may receive, a sidelink communication via the sidelink channel based at least in part on the sidelink channel access procedure. As described above in connection with the tenth operation 860, in some aspects the responsive communication may be a feedback communication (for example, a HARQ communication), in some other aspects the responsive communication may be a CSI report (for example, a CSI MAC CE), and in some other aspects the responsive communication may be an IUC information message (for example, IUC information MAC CE). More particularly, in some aspects, the Rx UE 810 may transmit, and the Tx UE 805 may receive, at least one of a feedback communication associated with the sidelink communication such as HARQ ACK or NACK feedback or a CSI report. In some other aspects, when the indication of the SL CAPC was received with an IUC request, the sidelink communication may be associated with an IUC information communication associated with the IUC request.

As described above in connection with FIG. 7, various mapping lookup tables may be used to map an SL CAPC to a QoS parameter. Accordingly, in some aspects, the network node 110 may select an appropriate mapping lookup table to be used for a channel access procedure (as described above in connection with FIG. 8) or may update a mapping lookup table based at least in part on sidelink channel measurements, performance, or similar metrics. Aspects of selecting and updating a mapping lookup table are described in more detail below in connection with FIG. 9.

Figure 9:
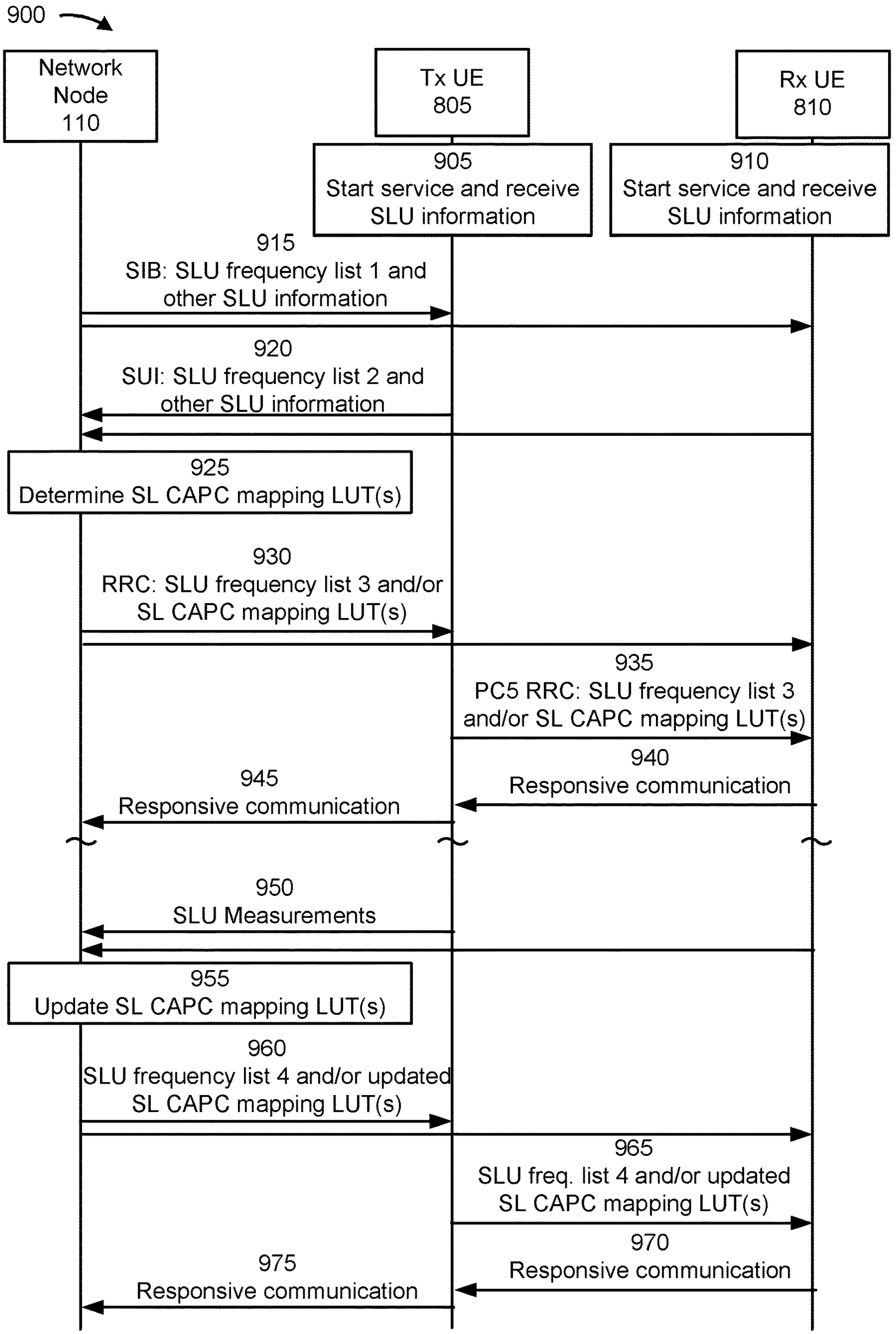
FIG. 9 is a diagram of an example associated with configuring a sidelink channel access priority class mapping lookup table in accordance with the present disclosure.

FIG. 9 is a diagram of an example 900 associated with configuring a sidelink channel access priority class mapping lookup table in accordance with the present disclosure.

In a first operation 905 and a second operation 910, the Tx UE 805 or the Rx UE 810 may start a sidelink service or receive information for communicating on a shared spectrum (sometimes referred to herein as SLU information) from an upper layer, such as a V2X layer or a ProSe layer. In some aspects, the SLU information may include a list of SLU frequency bands in which the respective UE 805, 810 is capable of operating (sometimes referred to as SLU frequency list 0, or SLU-freq-list0a or SLU-freq-list0b, respectively). In some aspects, each SLU frequency band may be associated with one or more LBT sub-bands or sub-channels, which may be associated with a bandwidth of 20 MHz. The SLU information may include additional information, such as a cast type associated with a sidelink service or communication (for example, one of unicast, broadcast or groupcast), PC5 QoS information associated with a sidelink service or communication (for example, QoS profile, PQI, priority level, PDB, among other examples), a destination identifier associated with a groupcast or broadcast communication of a sidelink service, a PC5 link identifier or a pair of source and destination identifiers associated with a unicast communication of a sidelink service, or similar information.

In a third operation 915, the network node 110 may transmit, and the Tx UE 805 or the Rx UE 810 (when the Rx UE 810 is within network coverage) may receive, system information block (SIB) for sidelink communications. In some aspects, the Tx UE 805 or the Rx UE 810 may receive the sidelink common configuration information via an sl-ConfigCommonNR information element (IE) included in a system information block (SIB), such as SIB12. In some aspects, the sidelink common configuration information may include an indication of one or more common configuration parameters. The Tx UE 805 or the Rx UE 810 may configure itself based at least in part on the common configuration information. In some aspects, the Tx UE 805 or the Rx UE 810 (for example, at RRC Idle or Inactive state) may be configured to perform one or more operations described herein based at least in part on the common configuration information for sidelink communications on shared spectrum.

In some aspects, in the third operation 915, the network node 110 may transmit, and the Tx UE 805 or the Rx UE 810 may receive, an indication of one or more SLU frequency bands, with a sidelink channel access procedure to be performed by the Tx UE 805 or the Rx UE 810 being associated with the one or more SLU frequency bands. More particularly, in some aspects, the network node 110 may transmit an indication of supported SLU frequencies (sometimes referred to as SLU frequency list 1, or SLU-freq-list1), supported SLU bandwidth parts (SLU BWPs) with associated resource pools, or SLU QoS information, among other SLU information. In some aspects, transmission of the SLU information may implicitly indicate to the Tx UE 805 or the Rx UE 810 that the network node 110 supports sidelink communication on a shared spectrum. In some aspects, the sidelink common configuration information may include an indication of one or more SL CAPCs associated to each sidelink unlicensed frequency or SLU BWP or associated to each resource pool (for example, a dedicated resource pool for discovery message, a transmission resource pool with random selection or partial sensing, or an exceptional resource pool, among other examples) within an SLU BWP. In some aspects, the sidelink common configuration information may include an indication of one or more SL CAPCs associated to QoS parameters (for example, QoS profiles, PQI, Priority level, or latency, among other examples). The Tx UE 805 or the Rx UE 810 (for example, at RRC Idle or Inactive state) may be configured to perform one or more operations described herein based at least in part on the common configuration information for sidelink communications on shared spectrum.

In a fourth operation 920, the Tx UE 805 or the Rx UE 810 may transmit, and the network node 110 may receive, sidelink UE information (sometimes referred to as a SidelinkUEInformationNR message) which may also include at least one of a UE capability to operate in one or more SLU frequency bands or a preferred SLU frequency band list. For example, in some aspects, the Tx UE 805 or the Rx UE 810 may transmit an indication of the Tx UE 805's or the Rx UE 810's preferred SLU frequency list (sometimes referred to as SLU frequency list 2, or SLU-freq-list2), which may be a common sub-list of the SLU frequency bands in which the respective UE 805, 810 is capable of operating (for example, SLU-freq-list0a or SLU-freq-list0b) and the SLU frequencies supported by the network node 110 (for example, SLU-freq-list1). In the fourth operation, the Tx UE 805 or the Rx UE 810 may indicate additional SLU information, such as PC5 QoS information associated to a destination identifier for a sidelink service or communication, a cast type (for example, unicast, broadcast, or groupcast) associated with the sidelink service or communication, or similar information for the sidelink service or communication based at least in part on the information received from the network node via the third operation 915 (for example, based at least in part on the information indicated in the acquired SIB12).

In a fifth operation 925, the network node 110 may determine one or more SL CAPCs (for example, SL CAPC mapping lookup tables) associated with one or more SLU frequency bands based at least in part on the received sidelink UE information (for example, SidelinkUEInformationNR message). In some aspects, the network node 110 may determine one or more SL CAPCs (for example, mapping lookup tables) associated with one or more SLU frequency bands via the mapping of the QoS parameter to the SL CAPC (for example, being based at least in part on the one or more mapping rules or lookup tables). For example, as described in connection with FIG. 7, multiple mapping rules or lookup tables may associate various SL CAPCs with QoS parameters, such as a V2X PQI or a V2X priority level for a sidelink communication of a V2X service, a ProSe PQI or a ProSe priority level for a sidelink communication of a ProSe service, a Layer 1 priority level for a sidelink communication, or another QoS parameter. Thus, the network node 110 may select one of multiple mapping lookup tables to be used for a given sidelink service or communication based at least in part on the received sidelink UE information. For example, the network node 110 may select one of multiple mapping lookup tables to be used for a given sidelink service or communication based at least in part on whether an SLU frequency list (for example, SLU-freq-list2) is shared with other radio access technologies (RATs), based at least in part on the PC5 QoS parameters associated with the sidelink service or communication, or based at least in part on similar information. In some aspects, the network node 110 may determine one or more SL CAPCs (for example, SL CAPC mapping lookup tables) associated with one or more SLU frequency bands based on at least one of sidelink channel status (for example, channel congestion measurement such as CBR or RSRP or RSSI), sidelink LBT performance (for example, LBT success or failure count or rate or UE consistent LBT failure count) or received PC5 QoS information associated to the sidelink service or communication (for example, associated to the destination identifier with a cast type).

In a sixth operation 930, the network node 110 may transmit, and the Tx UE 805 or the Rx UE 810 may receive, configuration information. For example, in some aspects, the network node 110 may transmit a first configuration (for example, a dedicated configuration) via an RRC message (sometimes referred to as RRCReconfiguration) to the Tx UE 805 or the Rx UE 810 (when the Rx UE 810 is in coverage). In some aspects, in the sixth operation the network node 110 may transmit, and the Tx UE 805 or the Rx UE 810 may receive, an indication of one or more mapping lookup tables associated with mapping a QoS parameter to the SL CAPC based at least in part on the sidelink UE information. Additionally or alternatively, the configuration information may indicate additional SLU information. For example, the configuration information may indicate another frequency list (sometimes referred to as SLU frequency list 3, or SLU-freq-list3) for the sidelink service or communication (for example, associated to the destination identifier with a cast type) with one or more LBT sub-bands or sub-channels for each frequency band on the frequency list.

In a seventh operation 935, the Tx UE 805 may transmit the first configuration (for example, a dedicated configuration) to the Rx UE 810, such as when the Rx UE 810 is not within network coverage. The Tx UE 805 may transmit the first configuration to the Rx UE 810 via a PC5 RRC configuration message when the Tx UE 805 is paired with the Rx UE 810 for sidelink communication in unicast. Additionally or alternatively, the Tx UE 805 may transmit the first configuration to the Rx UE 810 via a PC5 RRC broadcast message on a common signaling radio bearer (SRB), such as SRB0, when the Rx UE 810 is participating in a broadcast sidelink communication. Additionally or alternatively, the Tx UE 805 may transmit the first configuration to the Rx UE 810 via a PC5 RRC groupcast message on a group SRB, such as SRBg, when the Rx UE 810 is participating in a groupcast sidelink communication. In some aspects, the Tx UE 805 may transmit, and the Rx UE 810 may receive, an indication of the one or more mapping lookup tables associated with mapping a QoS parameter to the SL CAPC. Additionally or alternatively, the Tx UE 805 may transmit additional SLU information to the Rx UE 810. For example, the Tx UE 805 may transmit an indication of the SLU frequency list 3 (for example, SLU-freq-list3) for the sidelink service or communication (for example, associated to the destination identifier with a cast type), or similar information.

In some aspects, the Tx UE 805 or the Rx UE 810 may then use the mapping lookup table as part of a channel access procedure, as described above in connection with FIG. 8. Additionally or alternatively, in an eighth operation 940, the Rx UE 810 may transmit, and the Tx UE 805 may receive, a responsive communication based at least in part on the Rx UE 810 receiving the indication of the one or more mapping lookup tables associated with mapping the QoS parameter to the SL CAPC. For example, the Rx UE 810 may transmit a responsive communication to the Tx UE 805 via a responding PC5 RRC communication, such as via SRB0, SRBg, or a similar communication. Similarly, in ninth operation 945, the Tx UE 805 may transmit, and the network node 110 may receive, a responsive communication based at least in part on the Tx UE 805 receiving the indication of the one or more mapping lookup tables associated with mapping the QoS parameter to the SL CAPC. For example, the Tx UE 805 may transmit an RRC reconfiguration complete (sometimes referred to as RRCReconfigurationComplete) message to the network node 110.

In some aspects, the network node 110 may determine an updated SL CAPC mapping lookup table based at least in part on changing channel conditions or otherwise. For example, in a tenth operation 950, the Tx UE 805 or the Rx UE 810 may transmit, and the network node 110 may receive, an indication of one or more measurements associated with the sidelink channel access procedure. For example, the one or more measurements may be associated with a CBR or RSRP or RSSI associated with a sidelink channel, UE LBT measurements on the SLU frequency list 3 (for example, SLU-freq-list3), or similar measurements. The Tx UE 805 or the Rx UE 810 may transmit the one or more measurements to the network node 110 via an RRC message, such as via a sidelink UE information message (for example, SidelinkUEInformationNR), via a MAC-CE communication, or via an uplink control information (UCI) communication (for example, transmitted on PUSCH). In some aspects, the one or more measurements may indication the Tx UE 805's or the Rx UE 810's success or failure count or rate associated with a sidelink channel access procedure (for example, a sidelink LBT procedure), an indication of a consistent failure count associated with the sidelink channel access procedure, or similar measurements or information.

In an eleventh operation 955, the network node 110 may determine one or more updated SL CAPCs (for example, SL CAPC mapping lookup tables) based at least in part on the one or more measurements received from the Tx UE 805 or the Rx UE 810. For example, the network node 110 may determine one or more updated SL CAPC mapping lookup tables based at least in part on the CBR or RSRP or RSSI measurement, a sidelink channel access procedure (for example, a sidelink LBT procedure) success or failure count or rate or consistent failure count, or a similar measurement. Additionally or alternatively, the network node 110 may determine or more updated SL CAPC mapping lookup tables based at least in part on updated frequencies associated with SLU operation. For example, the network node may select different or updated SLU frequencies, carrier, or LBT sub-bands or sub-channels based at least in part on the indication of the one or more measurements associated with the sidelink channel access procedure. For example, if the Tx UE 805 or the Rx UE 810 indicates consistent LBT failure, the network node 110 may select different or updated SLU frequencies, carrier, or LBT sub-bands or sub-channels in an effort to increase a likelihood of an LBT procedure success.

In a twelfth operation 960, the network node 110 may transmit, and the Tx UE 805 or the Rx UE 810 may receive, additional configuration information. For example, the network node 110 may transmit a second configuration (for example, a dedicated configuration) via an RRC message, such as RRCReconfiguration. In some other aspects, the network node 110 may activate the second configuration via a MAC-CE. In some aspects, the second configuration may include an indication of one or more updated SL CAPC mapping lookup tables, with the one or more updated SL CAPC mapping lookup tables being based at least in part on the one or more measurements described above in connection with the tenth operation 950. In some aspects, the second configuration may include additional SLU information. For example, the network node 110 may transmit an indication of an updated frequency list (sometimes referred to as SLU frequency list 4, or SLU-freq-list4), which may indicate updated SLU frequencies, updated SLU carriers, one or more updated LBT sub-bands or sub-channels for each frequency band on the frequency list, one or more updated SL CAPCs for the sidelink service or communication, or similar SLU information.

Additionally or alternatively, in a thirteenth operation 965, the Tx UE 805 may transmit, and the Rx UE 810 may receive, the second configuration. More particularly, the Tx UE 805 may transmit, and the Rx UE 810 may receive, an indication of the one or more updated SL CAPC mapping lookup tables. In some aspects, in the thirteenth operation 965 the Tx UE 805 may indicate additional SLU information, such as the updated frequency list (for example, SLU-freq-list4), or similar information. The Tx UE 805 may transmit the second configuration to the Rx UE 810 via a PC5 RRC configuration message when the Tx UE 805 is paired with the Rx UE 810 for sidelink communication in unicast. Additionally or alternatively, the Tx UE 805 may transmit the additional configuration information to the Rx UE 810 via a PC5 RRC broadcast message on a common SRB, such as SRB0, when the Rx UE 810 is participating in a broadcast sidelink communication. Additionally or alternatively, the Tx UE 805 may transmit the additional configuration information to the Rx UE 810 via a PC5 RRC groupcast message on a group SRB, such as SRBg, when the Rx UE 810 is participating in a groupcast sidelink communication. Additionally or alternatively, the Tx UE 805 may activate the additional configuration information via a PC5 MAC-CE communication.

In some aspects, the Tx UE 805 or the Rx UE 810 may then use the updated SL CAPC mapping lookup table as part of a channel access procedure, as described above in connection with FIG. 8. Additionally or alternatively, in a fourteenth operation 970, the Rx UE 810 may transmit, and the Tx UE 805 may receive, a responsive communication based at least in part on the Rx UE 810 receiving the indication of the one or more updated mapping lookup tables associated with mapping the QoS parameter to the SL CAPC. For example, the Rx UE 810 may transmit a responsive communication to the Tx UE 805 via a responding PC5 RRC communication, such as via SRB0, SRBg, or a similar communication. Additionally or alternatively, the Rx UE 810 may transmit a responsive communication to the Tx UE 805 PC5 MAC-CE activation, such as a PC5 MAC-CE ACK communication. Similarly, in fifteenth operation 975, the Tx UE 805 may transmit, and the network node 110 may receive, a responsive communication based at least in part on the Tx UE 805 receiving the indication of the one or more updated mapping lookup tables associated with mapping the QoS parameter to the SL CAPC. For example, the Tx UE 805 may transmit an RRC reconfiguration complete (for example, RRCReconfigurationComplete) message to the network node 110. Additionally or alternatively, the Tx UE 805 may transmit a responsive communication to the MAC-CE activation, such as a MAC-CE ACK communication.

Based at least in part on the Tx UE 805 or the Rx UE 810 performing a sidelink channel access procedure based at least in part on an SL CAPC, the Tx UE 805 or the Rx UE 810 may conserve computing, power, network, or communication resources that may have otherwise been consumed by UEs 120 communicating in a shared spectrum, such as the SLU, without performing a priority based channel access procedure. For example, based at least in part on the Tx UE 805 or the Rx UE 810 performing a sidelink channel access procedure based at least in part on an SL CAPC, the Tx UE 805 or the Rx UE 810 may communicate with a reduced error rate, which may conserve computing, power, network, or communication resources that may have otherwise been consumed to detect or correct communication errors.

Figure 10:
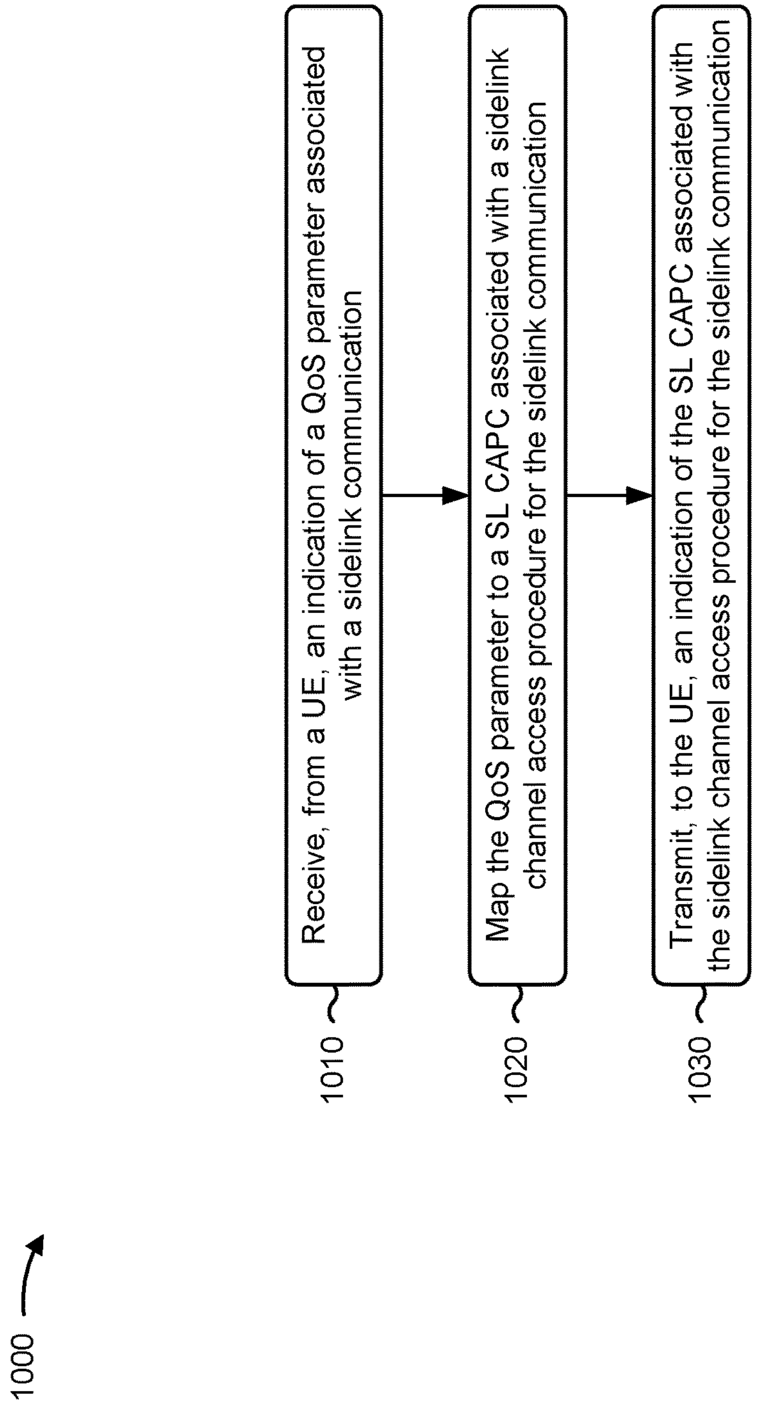
FIG. 10 is a flowchart illustrating an example process performed, for example, by a network node that supports a priority based channel access procedure for sidelink communications in accordance with the present disclosure.

FIG. 10 is a flowchart illustrating an example process 1000 performed, for example, by a network node that supports a priority based channel access procedure for sidelink communications in accordance with the present disclosure. Example process 1000 is an example where the network node (for example, network node 110) performs operations associated with a priority based channel access procedure for sidelink communications.

As shown in FIG. 10, in some aspects, process 1000 may include receiving, from a UE (for example, Tx UE 805), an indication of a QoS parameter associated with a sidelink communication (block 1010). For example, the network node (such as by using communication manager 150 or reception component 1302, depicted in FIG. 13) may receive, from a UE, an indication of a QoS parameter associated with a sidelink communication, as described above.

As further shown in FIG. 10, in some aspects, process 1000 may include mapping the QoS parameter to an SL CAPC associated with a sidelink channel access procedure for the sidelink communication (block 1020). For example, the network node (such as by using communication manager 150 or SL CAPC mapping component 1308, depicted in FIG. 13) may map the QoS parameter to an SL CAPC associated with a sidelink channel access procedure for the sidelink communication, as described above.

As further shown in FIG. 10, in some aspects, process 1000 may include transmitting, to the UE, an indication of the SL CAPC associated with the sidelink channel access procedure for the sidelink communication (block 1030). For example, the network node (such as by using communication manager 150 or transmission component 1504, depicted in FIG. 15) may transmit, to the UE, an indication of the SL CAPC associated with the sidelink channel access procedure for the sidelink communication, as described above.

Process 1000 may include additional aspects, such as any single aspect or any combination of aspects described below or in connection with one or more other processes described elsewhere herein.

In a first additional aspect, process 1000 includes determining a sidelink LBT mode associated with the sidelink channel access procedure, and transmitting, to the UE, an indication of the sidelink LBT mode.

In a second additional aspect, alone or in combination with the first aspect, process 1000 includes transmitting, to the UE, an indication of one or more sidelink unlicensed frequency bands, wherein the sidelink channel access procedure is associated with the one or more sidelink unlicensed frequency bands.

In a third additional aspect, alone or in combination with one or more of the first and second aspects, process 1000 includes receiving, from the UE, sidelink UE information indicating at least one of a capability to operate in one or more sidelink unlicensed frequency bands or a preferred sidelink unlicensed frequency band list.

In a fourth additional aspect, alone or in combination with one or more of the first through third aspects, process 1000 includes determining one or more mapping lookup tables associated with one or more sidelink unlicensed frequency bands based at least in part on the sidelink UE information, wherein the mapping of the QoS parameter to the SL CAPC is based at least in part on the one or more mapping lookup tables.

In a fifth additional aspect, alone or in combination with one or more of the first through fourth aspects, process 1000 includes receiving, from the UE, an indication of one or more measurements associated with the sidelink channel access procedure, and determining one or more updated mapping lookup tables based at least in part on the one or more measurements.

Although FIG. 10 shows example blocks of process 1000, in some aspects, process 1000 may include additional blocks, fewer blocks, different blocks, or differently arranged blocks than those depicted in FIG. 10. Additionally or alternatively, two or more of the blocks of process 1000 may be performed in parallel.

Figure 11:
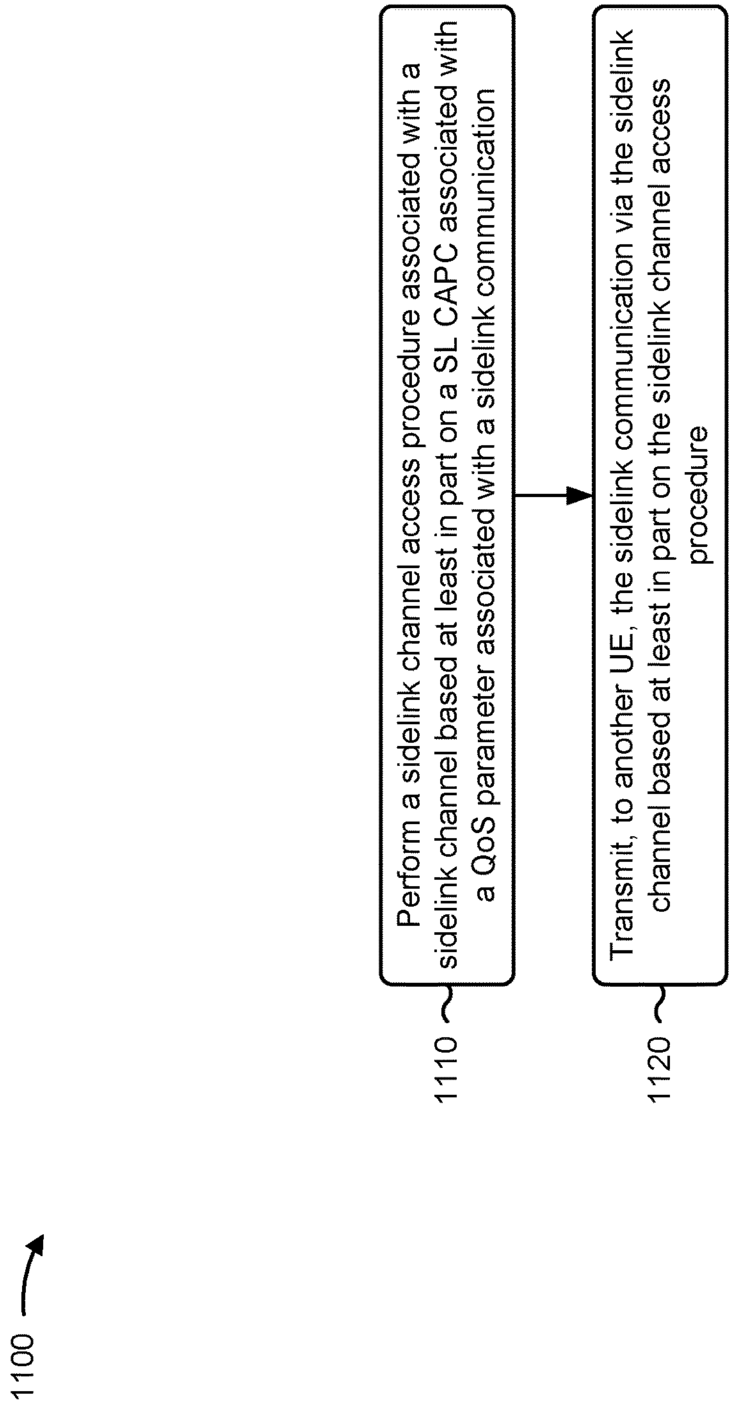
FIG. 11 is a flowchart illustrating an example process performed, for example, by a UE that supports a priority based channel access procedure for sidelink communications in accordance with the present disclosure.

FIG. 11 is a flowchart illustrating an example process 1100 performed, for example, by a UE that supports a priority based channel access procedure for sidelink communications in accordance with the present disclosure. Example process 1100 is an example where the UE (for example, Tx UE 805) performs operations associated with a priority based channel access procedure for sidelink communications.

As shown in FIG. 11, in some aspects, process 1100 may include performing a sidelink channel access procedure associated with a sidelink channel based at least in part on an SL CAPC associated with a QoS parameter associated with a sidelink communication (block 1110). For example, the UE (such as by using communication manager 140 or sidelink channel access component 1408, depicted in FIG.

14) may perform a sidelink channel access procedure associated with a sidelink channel based at least in part on an SL CAPC associated with a QoS parameter associated with a sidelink communication, as described above.

As further shown in FIG. 11, in some aspects, process 1100 may include transmitting, to another UE, the sidelink communication via the sidelink channel based at least in part on the sidelink channel access procedure (block 1120). For example, the UE (such as by using communication manager 140 or transmission component 1404, depicted in FIG. 14) may transmit, to another UE, the sidelink communication via the sidelink channel based at least in part on the sidelink channel access procedure, as described above.

Process 1100 may include additional aspects, such as any single aspect or any combination of aspects described below or in connection with one or more other processes described elsewhere herein.

In a first additional aspect, process 1100 includes transmitting, to a network node, an indication of the QoS parameter, and receiving, from the network node, an indication of the SL CAPC based at least in part on the indication of the QoS parameter.

In a second additional aspect, alone or in combination with the first aspect, process 1100 includes receiving, from the network node, an indication of a sidelink LBT mode associated with the sidelink channel access procedure, wherein performing the sidelink channel access procedure is further based at least in part on the sidelink LBT mode.

In a third additional aspect, alone or in combination with one or more of the first and second aspects, process 1100 includes mapping the QoS parameter to the SL CAPC.

In a fourth additional aspect, alone or in combination with one or more of the first through third aspects, process 1100 includes determining a sidelink LBT mode associated with the sidelink channel access procedure, wherein performing the sidelink channel access procedure is further based at least in part on the sidelink LBT mode.

In a fifth additional aspect, alone or in combination with one or more of the first through fourth aspects, process 1100 includes transmitting, to the other UE, an indication of at least one of the SL CAPC or a sidelink LBT mode associated with the sidelink channel access procedure.

In a sixth additional aspect, alone or in combination with one or more of the first through fifth aspects, process 1100 includes receiving, from the other UE and via the sidelink channel, at least one of a feedback communication associated with the sidelink communication or a channel state information report.

In a seventh additional aspect, alone or in combination with one or more of the first through sixth aspects, the sidelink communication is associated with an IUC request, and the IUC request includes an indication of at least one of the SL CAPC or a sidelink LBT mode associated with the sidelink channel access procedure.

In an eighth additional aspect, alone or in combination with one or more of the first through seventh aspects, process 1100 includes receiving, from the other UE and via the sidelink channel, an IUC information communication associated with the IUC request.

In a ninth additional aspect, alone or in combination with one or more of the first through eighth aspects, process 1100 includes receiving, from a network node, an indication of one or more sidelink unlicensed frequency bands, wherein the sidelink channel access procedure is associated with the one or more sidelink unlicensed frequency bands.

In a tenth additional aspect, alone or in combination with one or more of the first through ninth aspects, process 1100 includes transmitting, to a network node, sidelink UE information indicating at least one of a capability to operate in one or more sidelink unlicensed frequency bands or a preferred sidelink unlicensed frequency band list.

In an eleventh additional aspect, alone or in combination with one or more of the first through tenth aspects, process 1100 includes receiving, from a network node, an indication of one or more mapping lookup tables associated with mapping a quality of service parameter to the SL CAPC based at least in part on the sidelink UE information.

In a twelfth additional aspect, alone or in combination with one or more of the first through eleventh aspects, process 1100 includes transmitting, to the other UE, another indication of the one or more mapping lookup tables.

In a thirteenth additional aspect, alone or in combination with one or more of the first through twelfth aspects, process 1100 includes transmitting, to the network node, an indication of one or more measurements associated with the sidelink channel access procedure, and receiving, from the network node, an indication of one or more updated mapping lookup tables, wherein the one or more updated mapping lookup tables are based at least in part on the one or more measurements.

In a fourteenth additional aspect, alone or in combination with one or more of the first through thirteenth aspects, process 1100 includes transmitting, to the other UE, another indication of the one or more updated mapping lookup tables.

Although FIG. 11 shows example blocks of process 1100, in some aspects, process 1100 may include additional blocks, fewer blocks, different blocks, or differently arranged blocks than those depicted in FIG. 11. Additionally or alternatively, two or more of the blocks of process 1100 may be performed in parallel.

Figure 12:
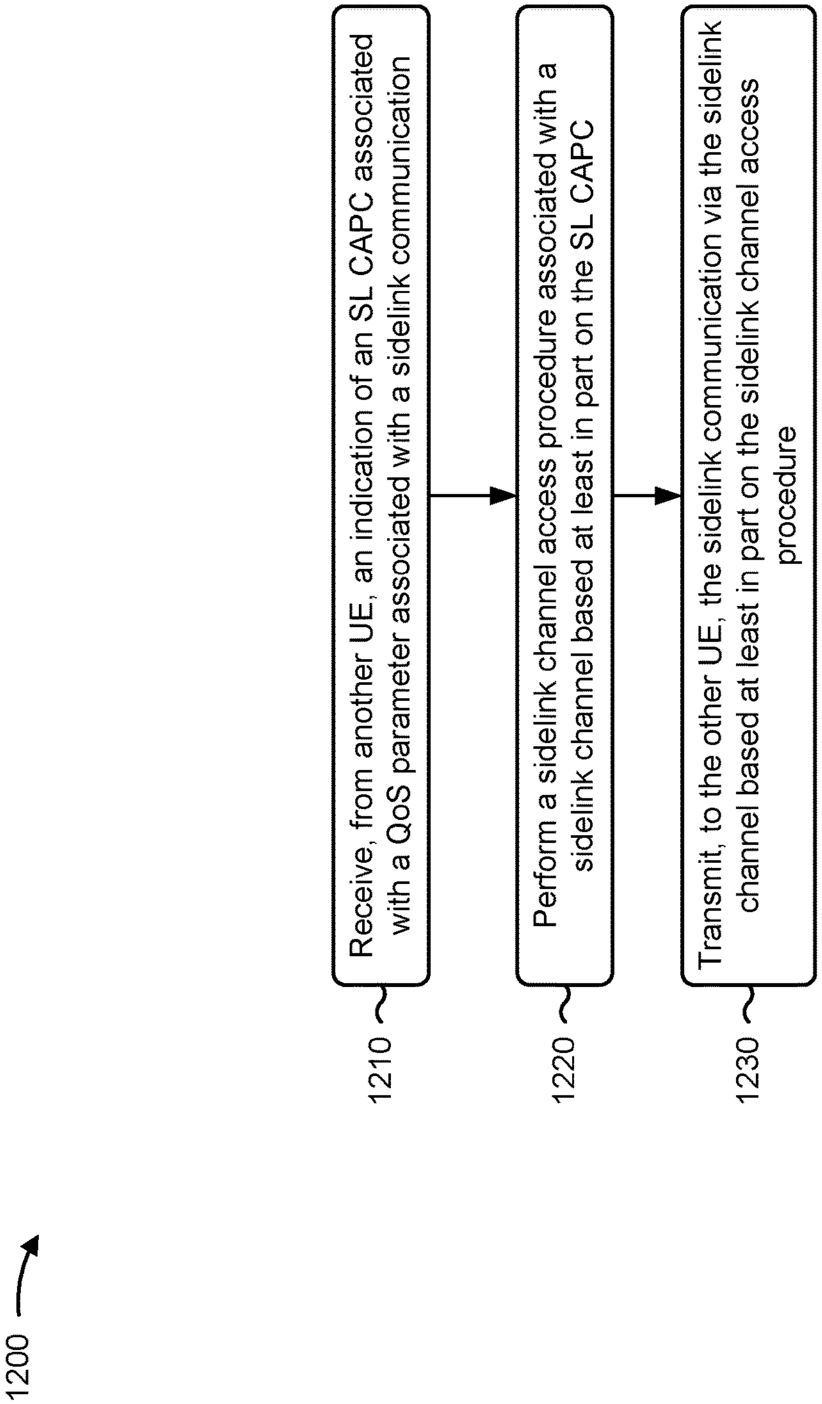
FIG. 12 is a flowchart illustrating an example process performed, for example, by a UE that supports a priority based channel access procedure for sidelink communications in accordance with the present disclosure.

FIG. 12 is a flowchart illustrating an example process 1200 performed, for example, by a UE that supports a priority based channel access procedure for sidelink communications in accordance with the present disclosure. Example process 1200 is an example where the UE (for example, Rx UE 810) performs operations associated with a priority based channel access procedure for sidelink communications.

As shown in FIG. 12, in some aspects, process 1200 may include receiving, from another UE, an indication of an SL CAPC associated with a QoS parameter associated with a sidelink communication (block 1210). For example, the UE (such as by using communication manager 140 or reception component 1502, depicted in FIG. 15) may receive, from another UE, an indication of an SL CAPC associated with a QoS parameter associated with a sidelink communication, as described above.

As further shown in FIG. 12, in some aspects, process 1200 may include performing a sidelink channel access procedure associated with a sidelink channel based at least in part on the SL CAPC (block 1220). For example, the UE (such as by using communication manager 140 or sidelink channel access component 1508, depicted in FIG. 15) may perform a sidelink channel access procedure associated with a sidelink channel based at least in part on the SL CAPC, as described above.

As further shown in FIG. 12, in some aspects, process 1200 may include transmitting, to the other UE, the sidelink communication via the sidelink channel based at least in part on the sidelink channel access procedure (block 1230). For example, the UE (such as by using communication manager 140 or transmission component 1504, depicted in FIG. 15) may transmit, to the other UE, the sidelink communication via the sidelink channel based at least in part on the sidelink channel access procedure, as described above.

Process 1200 may include additional aspects, such as any single aspect or any combination of aspects described below or in connection with one or more other processes described elsewhere herein.

In a first additional aspect, process 1200 includes receiving, from the other UE, an indication of a sidelink LBT mode associated with the sidelink channel access procedure, wherein performing the sidelink channel access procedure associated with the sidelink channel is further based at least in part on the sidelink LBT mode.

In a second additional aspect, alone or in combination with the first aspect, the sidelink communication is associated with at least one of a feedback communication or a channel state information report.

In a third additional aspect, alone or in combination with one or more of the first and second aspects, the indication of the SL CAPC is received via an IUC request, and the sidelink communication is associated with an IUC information communication associated with the IUC request.

In a fourth additional aspect, alone or in combination with one or more of the first through third aspects, process 1200 includes receiving, from the other UE, an indication of one or more mapping lookup tables associated with mapping a quality of service parameter to the SL CAPC.

In a fifth additional aspect, alone or in combination with one or more of the first through fourth aspects, process 1200 includes receiving, from the other UE, an indication of one or more updated mapping lookup tables.

Although FIG. 12 shows example blocks of process 1200, in some aspects, process 1200 may include additional blocks, fewer blocks, different blocks, or differently arranged blocks than those depicted in FIG. 12. Additionally or alternatively, two or more of the blocks of process 1200 may be performed in parallel.

Figure 13:
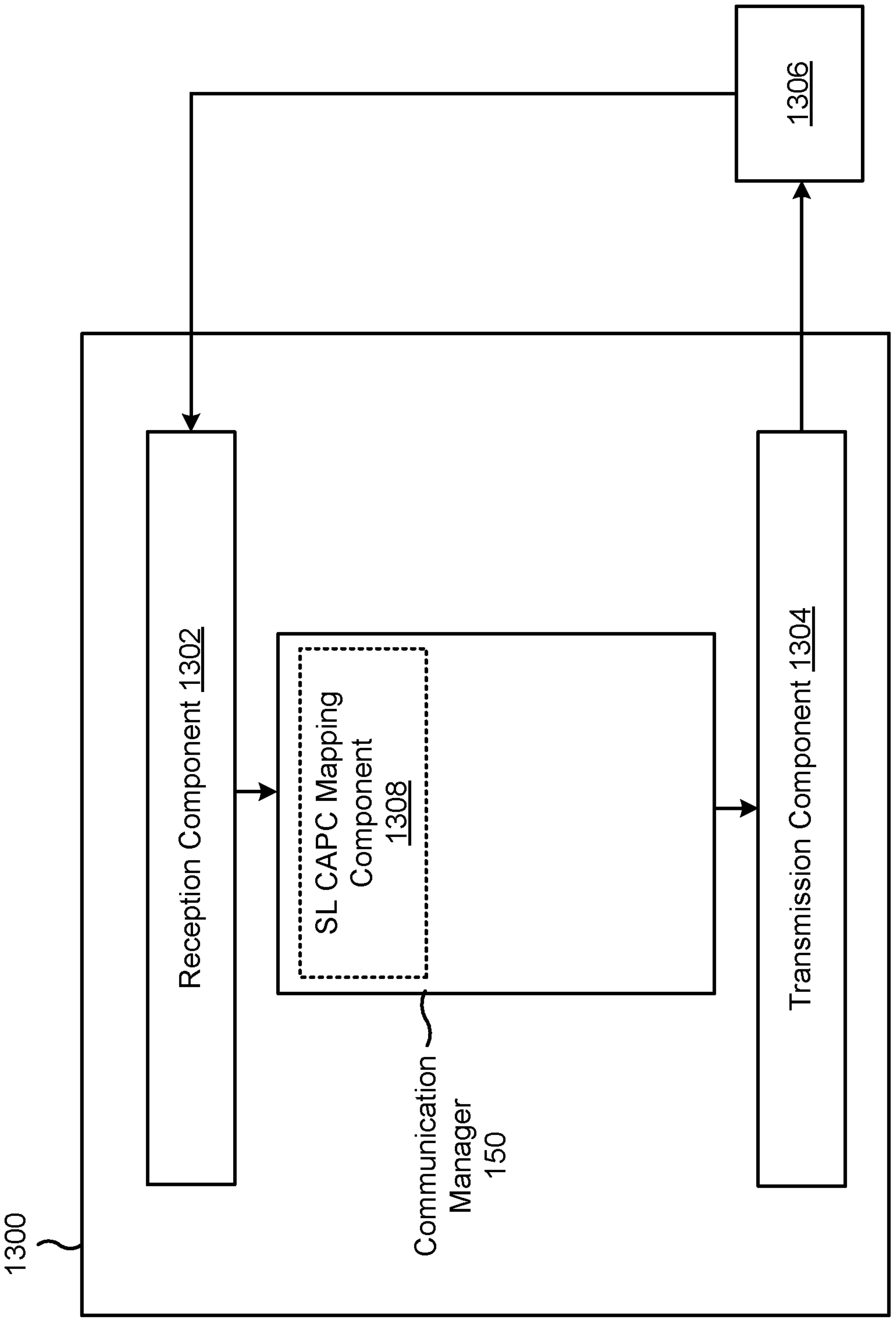
FIG. 13 is a diagram of an example apparatus for wireless communication in accordance with the present disclosure.

FIG. 13 is a diagram of an example apparatus 1300 for wireless communication in accordance with the present disclosure. The apparatus 1300 may be a network node (for example, network node 110), or a network node may include the apparatus 1300. In some aspects, the apparatus 1300 includes a reception component 1302 and a transmission component 1304, which may be in communication with one another (for example, via one or more buses or one or more other components). As shown, the apparatus 1300 may communicate with another apparatus 1306 (such as a UE 120, a network node 110, or another wireless communication device) using the reception component 1302 and the transmission component 1304. As further shown, the apparatus 1300 may include the communication manager 150. The communication manager 150 may include an SL CAPC mapping component 1308, among other examples.

In some aspects, the apparatus 1300 may be configured to perform one or more operations described herein in connection with FIGS. 6-9. Additionally or alternatively, the apparatus 1300 may be configured to perform one or more processes described herein, such as process 1000 of FIG. 10. In some aspects, the apparatus 1300 or one or more components shown in FIG. 13 may include one or more components of the network node 110 described in connection with FIG. 2. Additionally or alternatively, one or more components shown in FIG. 13 may be implemented within one or more components described in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the network node 110 described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the network node 110 described in connection with FIG. 2. In some aspects, the transmission component 1304 may be co-located with the reception component 1302 in a transceiver.

The reception component 1302 may receive, from a UE (for example, Tx UE 805), an indication of a QoS parameter associated with a sidelink communication. The SL CAPC mapping component 1308 may map the QoS parameter to an SL CAPC associated with a sidelink channel access procedure for the sidelink communication. The transmission component 1304 may transmit, to the UE, an indication of the SL CAPC associated with the sidelink channel access procedure for the sidelink communication.

The SL CAPC mapping component 1308 may determine a sidelink LBT mode associated with the sidelink channel access procedure.

The transmission component 1304 may transmit, to the UE, an indication of the sidelink LBT mode.

The transmission component 1304 may transmit, to the UE, an indication of one or more sidelink unlicensed frequency bands, wherein the sidelink channel access procedure is associated with the one or more sidelink unlicensed frequency bands.

The reception component 1302 may receive, from the UE, sidelink UE information indicating at least one of a capability to operate in one or more sidelink unlicensed frequency bands or a preferred sidelink unlicensed frequency band list.

The SL CAPC mapping component 1308 may determine one or more mapping lookup tables associated with one or more sidelink unlicensed frequency bands based at least in part on the sidelink UE information, wherein the mapping of the QoS parameter to the SL CAPC is based at least in part on the one or more mapping lookup tables.

The reception component 1302 may receive, from the UE, an indication of one or more measurements associated with the sidelink channel access procedure.

The SL CAPC mapping component 1308 may determine one or more updated mapping lookup tables based at least in part on the one or more measurements.

The quantity and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally or alternatively, a set of (one or more) components shown in FIG. 13 may perform one or more functions described as being performed by another set of components shown in FIG. 13.

Figure 14:
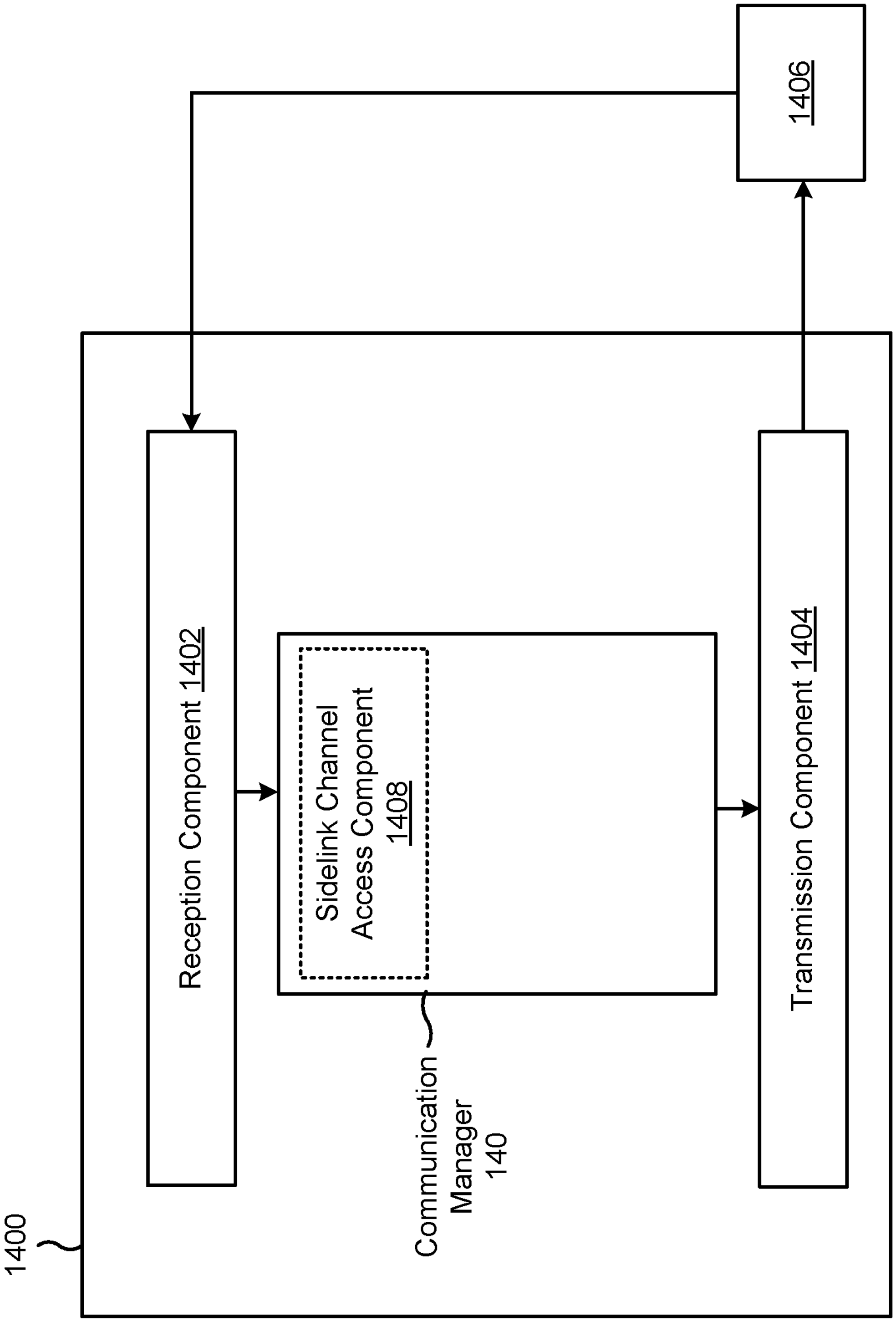
FIG. 14 is a diagram of an example apparatus for wireless communication in accordance with the present disclosure.

FIG. 14 is a diagram of an example apparatus 1400 for wireless communication in accordance with the present disclosure. The apparatus 1400 may be a UE (for example, Tx UE 805), or a UE may include the apparatus 1400. In some aspects, the apparatus 1400 includes a reception component 1402 and a transmission component 1404, which may be in communication with one another (for example, via one or more buses or one or more other components). As shown, the apparatus 1400 may communicate with another apparatus 1406 (such as a UE 120, a network node 110, or another wireless communication device) using the reception component 1402 and the transmission component 1404. As further shown, the apparatus 1400 may include the communication manager 140. The communication manager 140 may include a sidelink channel access component 1408, among other examples.

In some aspects, the apparatus 1400 may be configured to perform one or more operations described herein in connection with FIGS. 6-9. Additionally or alternatively, the apparatus 1400 may be configured to perform one or more processes described herein, such as process 1100 of FIG. 11. In some aspects, the apparatus 1400 or one or more components shown in FIG. 14 may include one or more components of the UE 120 described in connection with FIG. 2. Additionally or alternatively, one or more components shown in FIG. 14 may be implemented within one or more components described in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the UE 120 described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the UE 120 described in connection with FIG. 2. In some aspects, the transmission component 1404 may be co-located with the reception component 1402 in a transceiver.

The sidelink channel access component 1408 may perform a sidelink channel access procedure associated with a sidelink channel based at least in part on an SL CAPC associated with a QoS parameter associated with a sidelink communication. The transmission component 1404 may transmit, to another UE (for example, Rx UE 810), the sidelink communication via the sidelink channel based at least in part on the sidelink channel access procedure.

The transmission component 1404 may transmit, to a network node (for example, network node 110), an indication of the QoS parameter.

The reception component 1402 may receive, from the network node, an indication of the SL CAPC based at least in part on the indication of the QoS parameter.

The reception component 1402 may receive, from the network node, an indication of a sidelink LBT mode associated with the sidelink channel access procedure, wherein performing the sidelink channel access procedure is further based at least in part on the sidelink LBT mode.

The sidelink channel access component 1408 may map the QoS parameter to the SL CAPC.

The sidelink channel access component 1408 may determine a sidelink LBT mode associated with the sidelink channel access procedure, wherein performing the sidelink channel access procedure is further based at least in part on the sidelink LBT mode.

The transmission component 1404 may transmit, to the other UE, an indication of at least one of the SL CAPC or a sidelink LBT mode associated with the sidelink channel access procedure.

The reception component 1402 may receive, from the other UE and via the sidelink channel, at least one of a feedback communication associated with the sidelink communication or a channel state information report.

The reception component 1402 may receive, from the other UE and via the sidelink channel, an IUC information communication associated with an IUC request.

The reception component 1402 may receive, from a network node, an indication of one or more sidelink unlicensed frequency bands, wherein the sidelink channel access procedure is associated with the one or more sidelink unlicensed frequency bands.

The transmission component 1404 may transmit, to a network node, sidelink UE information indicating at least one of a capability to operate in one or more sidelink unlicensed frequency bands or a preferred sidelink unlicensed frequency band list.

The reception component 1402 may receive, from a network node, an indication of one or more mapping lookup tables associated with mapping a quality of service parameter to the SL CAPC based at least in part on the sidelink UE information.

The transmission component 1404 may transmit, to the other UE, another indication of the one or more mapping lookup tables.

The transmission component 1404 may transmit, to the network node, an indication of one or more measurements associated with the sidelink channel access procedure.

The reception component 1402 may receive, from the network node, an indication of one or more updated mapping lookup tables, wherein the one or more updated mapping lookup tables are based at least in part on the one or more measurements.

The transmission component 1404 may transmit, to the other UE, another indication of the one or more updated mapping lookup tables.

The quantity and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally or alternatively, a set of (one or more) components shown in FIG. 14 may perform one or more functions described as being performed by another set of components shown in FIG. 14.

Figure 15:
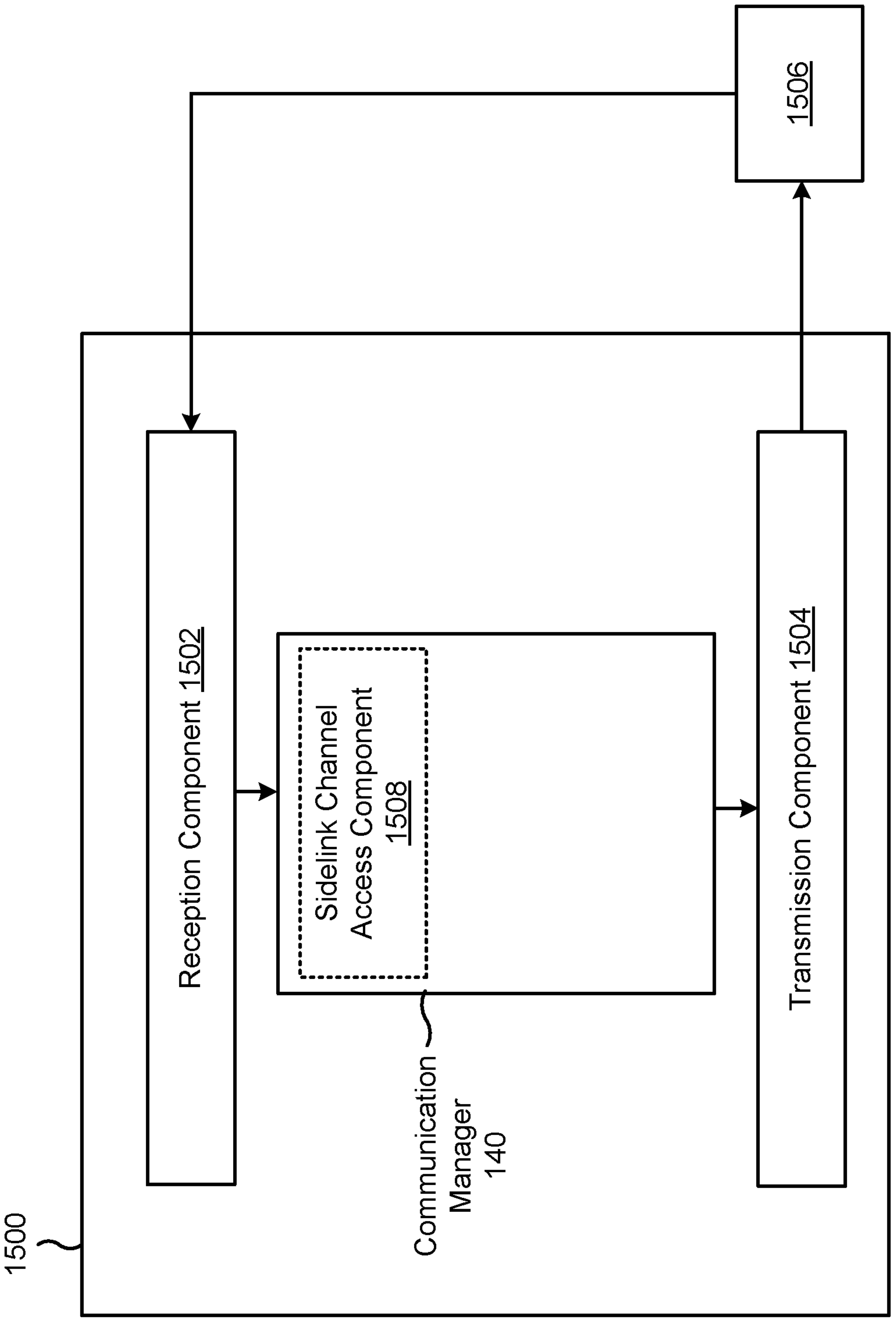
FIG. 15 is a diagram of an example apparatus for wireless communication in accordance with the present disclosure.

FIG. 15 is a diagram of an example apparatus 1500 for wireless communication in accordance with the present disclosure. The apparatus 1500 may be a UE (for example, Rx UE 810), or a UE may include the apparatus 1500. In some aspects, the apparatus 1500 includes a reception component 1502 and a transmission component 1504, which may be in communication with one another (for example, via one or more buses or one or more other components). As shown, the apparatus 1500 may communicate with another apparatus 1506 (such as a UE 120, a network node 110, or another wireless communication device) using the reception component 1502 and the transmission component 1504. As further shown, the apparatus 1500 may include the communication manager 140. The communication manager 140 may include a sidelink channel access component 1508, among other examples.

In some aspects, the apparatus 1500 may be configured to perform one or more operations described herein in connection with FIGS. 6-9. Additionally or alternatively, the apparatus 1500 may be configured to perform one or more processes described herein, such as process 1200 of FIG. 12. In some aspects, the apparatus 1500 or one or more components shown in FIG. 15 may include one or more components of the UE 120 described in connection with FIG. 2. Additionally or alternatively, one or more components shown in FIG. 15 may be implemented within one or more components described in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the UE 120 described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the UE 120 described in connection with FIG. 2. In some aspects, the transmission component 1504 may be co-located with the reception component 1502 in a transceiver.

The reception component 1502 may receive, from another UE (for example, Tx UE 805), an indication of an SL CAPC associated with a QoS parameter associated with a sidelink communication. The sidelink channel access component 1508 may perform a sidelink channel access procedure associated with a sidelink channel based at least in part on the SL CAPC. The transmission component 1504 may transmit, to the other UE, the sidelink communication via the sidelink channel based at least in part on the sidelink channel access procedure.

The reception component 1502 may receive, from the other UE, an indication of a sidelink LBT mode associated with the sidelink channel access procedure, wherein performing the sidelink channel access procedure associated with the sidelink channel is further based at least in part on the sidelink LBT mode.

The reception component 1502 may receive, from the other UE, an indication of one or more mapping lookup tables associated with mapping a quality of service parameter to the SL CAPC.

The reception component 1502 may receive, from the other UE, an indication of one or more updated mapping lookup tables.

The quantity and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally or alternatively, a set of (one or more) components shown in FIG. 15 may perform one or more functions described as being performed by another set of components shown in FIG. 15.

The following provides an overview of some Aspects of the present disclosure:

Aspect 1: A method of wireless communication performed by a network node, comprising: receiving, from a UE, an indication of a QoS parameter associated with a sidelink communication; mapping the QoS parameter to an SL CAPC associated with a sidelink channel access procedure for the sidelink communication; and transmitting, to the UE, an indication of the SL CAPC associated with the sidelink channel access procedure for the sidelink communication.

Aspect 2: The method of Aspect 1, further comprising: determining a sidelink LBT mode associated with the sidelink channel access procedure; and transmitting, to the UE, an indication of the sidelink LBT mode.

Aspect 3: The method of any of Aspects 1-2, further comprising transmitting, to the UE, an indication of one or more sidelink unlicensed frequency bands, wherein the sidelink channel access procedure is associated with the one or more sidelink unlicensed frequency bands.

Aspect 4: The method of any of Aspects 1-3, further comprising receiving, from the UE, sidelink UE information indicating at least one of a capability to operate in one or more sidelink unlicensed frequency bands or a preferred sidelink unlicensed frequency band list.

Aspect 5: The method of Aspect 4, further comprising determining one or more mapping lookup tables associated with one or more sidelink unlicensed frequency bands based at least in part on the sidelink UE information, wherein the mapping of the QoS parameter to the SL CAPC is based at least in part on the one or more mapping lookup tables.

Aspect 6: The method of any of Aspects 1-5, further comprising: receiving, from the UE, an indication of one or more measurements associated with the sidelink channel access procedure; and determining one or more updated mapping lookup tables based at least in part on the one or more measurements.

Aspect 7: A method of wireless communication performed by a UE, comprising: performing a sidelink channel access procedure associated with a sidelink channel based at least in part on an SL CAPC associated with a QoS parameter associated with a sidelink communication; and transmitting, to another UE, the sidelink communication via the sidelink channel based at least in part on the sidelink channel access procedure.

Aspect 8: The method of Aspect 7, further comprising: transmitting, to a network node, an indication of the QoS parameter; and receiving, from the network node, an indication of the SL CAPC based at least in part on the indication of the QoS parameter.

Aspect 9: The method of Aspect 8, further comprising receiving, from the network node, an indication of a sidelink LBT mode associated with the sidelink channel access procedure, wherein performing the sidelink channel access procedure is further based at least in part on the sidelink LBT mode.

Aspect 10: The method of any of Aspects 7-9, further comprising mapping the QoS parameter to the SL CAPC.

Aspect 11: The method of Aspect 10, further comprising determining a sidelink LBT mode associated with the sidelink channel access procedure, wherein performing the sidelink channel access procedure is further based at least in part on the sidelink LBT mode.

Aspect 12: The method of any of Aspects 7-11, further comprising transmitting, to the other UE, an indication of at least one of the SL CAPC or a sidelink LBT mode associated with the sidelink channel access procedure.

Aspect 13: The method of any of Aspects 7-12, further comprising receiving, from the other UE and via the sidelink channel, at least one of a feedback communication associated with the sidelink communication or a channel state information report.

Aspect 14: The method of any of Aspects 7-13, wherein the sidelink communication is associated with an IUC request, and wherein the IUC request includes an indication of at least one of the SL CAPC or a sidelink LBT mode associated with the sidelink channel access procedure.

Aspect 15: The method of Aspect 14, further comprising receiving, from the other UE and via the sidelink channel, an IUC information communication associated with the IUC request.

Aspect 16: The method of any of Aspects 7-15, further comprising receiving, from a network node, an indication of one or more sidelink unlicensed frequency bands, wherein the sidelink channel access procedure is associated with the one or more sidelink unlicensed frequency bands.

Aspect 17: The method of any of Aspects 7-16, further comprising transmitting, to a network node, sidelink UE information indicating at least one of a capability to operate in one or more sidelink unlicensed frequency bands or a preferred sidelink unlicensed frequency band list.

Aspect 18: The method of Aspect 17, further comprising receiving, from a network node, an indication of one or more mapping lookup tables associated with mapping a quality of service parameter to the SL CAPC based at least in part on the sidelink UE information.

Aspect 19: The method of Aspect 18, further comprising transmitting, to the other UE, another indication of the one or more mapping lookup tables.

Aspect 20: The method of any of Aspects 18-19, further comprising: transmitting, to the network node, an indication of one or more measurements associated with the sidelink channel access procedure; and receiving, from the network node, an indication of one or more updated mapping lookup tables, wherein the one or more updated mapping lookup tables are based at least in part on the one or more measurements.

Aspect 21: The method of Aspect 20, further comprising transmitting, to the other UE, another indication of the one or more updated mapping lookup tables.

Aspect 22: A method of wireless communication performed by a UE, comprising: receiving, from another UE, an indication of an SL CAPC associated with a QoS parameter associated with a sidelink communication; performing a sidelink channel access procedure associated with a sidelink channel based at least in part on the SL CAPC; and transmitting, to the other UE, the sidelink communication via the sidelink channel based at least in part on the sidelink channel access procedure.

Aspect 23: The method of Aspect 22, further comprising receiving, from the other UE, an indication of a sidelink LBT mode associated with the sidelink channel access procedure, wherein performing the sidelink channel access procedure associated with the sidelink channel is further based at least in part on the sidelink LBT mode.

Aspect 24: The method of any of Aspects 22-23, wherein the sidelink communication is associated with at least one of a feedback communication or a channel state information report.

Aspect 25: The method of any of Aspects 22-24, wherein the indication of the SL CAPC is received via an IUC request, and wherein the sidelink communication is associated with an IUC information communication associated with the IUC request.

Aspect 26: The method of any of Aspects 22-25, further comprising receiving, from the other UE, an indication of one or more mapping lookup tables associated with mapping a quality of service parameter to the SL CAPC.

Aspect 27: The method of Aspect 26, further comprising receiving, from the other UE, an indication of one or more updated mapping lookup tables.

Aspect 28: An apparatus for wireless communication at a device, comprising a processor; memory coupled with the processor; and instructions stored in the memory and executable by the processor to cause the apparatus to perform the method of one or more of Aspects 1-6.

Aspect 29: A device for wireless communication, comprising a memory and one or more processors coupled to the memory, the one or more processors configured to perform the method of one or more of Aspects 1-6.

Aspect 30: An apparatus for wireless communication, comprising at least one means for performing the method of one or more of Aspects 1-6.

Aspect 31: A non-transitory computer-readable medium storing code for wireless communication, the code comprising instructions executable by a processor to perform the method of one or more of Aspects 1-6.

Aspect 32: A non-transitory computer-readable medium storing a set of instructions for wireless communication, the set of instructions comprising one or more instructions that, when executed by one or more processors of a device, cause the device to perform the method of one or more of Aspects 1-6.

Aspect 33: An apparatus for wireless communication at a device, comprising a processor; memory coupled with the processor; and instructions stored in the memory and executable by the processor to cause the apparatus to perform the method of one or more of Aspects 7-21.

Aspect 34: A device for wireless communication, comprising a memory and one or more processors coupled to the memory, the one or more processors configured to perform the method of one or more of Aspects 7-21.

Aspect 35: An apparatus for wireless communication, comprising at least one means for performing the method of one or more of Aspects 7-21.

Aspect 36: A non-transitory computer-readable medium storing code for wireless communication, the code comprising instructions executable by a processor to perform the method of one or more of Aspects 7-21.

Aspect 37: A non-transitory computer-readable medium storing a set of instructions for wireless communication, the set of instructions comprising one or more instructions that, when executed by one or more processors of a device, cause the device to perform the method of one or more of Aspects 7-21.

Aspect 38: An apparatus for wireless communication at a device, comprising a processor; memory coupled with the processor; and instructions stored in the memory and executable by the processor to cause the apparatus to perform the method of one or more of Aspects 22-27.

Aspect 39: A device for wireless communication, comprising a memory and one or more processors coupled to the memory, the one or more processors configured to perform the method of one or more of Aspects 22-27.

Aspect 40: An apparatus for wireless communication, comprising at least one means for performing the method of one or more of Aspects 22-27.

Aspect 41: A non-transitory computer-readable medium storing code for wireless communication, the code comprising instructions executable by a processor to perform the method of one or more of Aspects 22-27.

Aspect 42: A non-transitory computer-readable medium storing a set of instructions for wireless communication, the set of instructions comprising one or more instructions that, when executed by one or more processors of a device, cause the device to perform the method of one or more of Aspects 22-27.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "or," unless explicitly stated otherwise (for example, if used in combination with "either" or "only one of").

What is claimed is:

1. A network node for wireless communication, comprising:
at least one memory; and
at least one processor communicatively coupled with the at least one memory, the at least one processor configured to cause the network node to:
map a plurality of PC5 New Radio (NR) standardized quality of service (QoS) identifiers (PQIs) to a plurality of sidelink channel access priority classes (SL CAPCs);
receive, from a user equipment (UE), an indication of a PQI associated with a sidelink communication, wherein the plurality of PQIs include the PQI;
determine a SL CAPC, associated with a sidelink channel access procedure for the sidelink communication, based at least in part on a mapping of the PQI to the SL CAPC, wherein the plurality of SL CAPCs include the SL CAPC, and wherein the mapping of the plurality of PQIs to the plurality of SL CAPCs include the mapping of the PQI to the SL CAPC; and
transmit, to the UE, an indication of the SL CAPC associated with the sidelink channel access procedure for the sidelink communication.

2. The network node of claim 1, wherein the at least one processor is further configured to cause the network node to:
determine a sidelink listen-before-talk (LBT) mode associated with the sidelink channel access procedure; and
transmit, to the UE, an indication of the sidelink LBT mode.

3. The network node of claim 1, wherein the at least one processor is further configured to cause the network node to transmit, to the UE, an indication of one or more sidelink unlicensed frequency bands, wherein the sidelink channel access procedure is associated with the one or more sidelink unlicensed frequency bands.

4. The network node of claim 1, wherein the at least one processor is further configured to cause the network node to receive, from the UE, sidelink UE information indicating at least one of a capability to operate in one or more sidelink unlicensed frequency bands or a preferred sidelink unlicensed frequency band list.

5. The network node of claim 4, wherein the at least one processor is further configured to cause the network node to determine one or more mapping lookup tables associated with one or more sidelink unlicensed frequency bands based at least in part on the sidelink UE information; and
wherein the at least one processor is further configured to cause the network node to map the PQI to the SL CAPC based at least in part on the one or more mapping lookup tables.

6. The network node of claim 1, wherein the at least one processor is further configured to cause the network node to:
receive, from the UE, an indication of one or more measurements associated with the sidelink channel access procedure; and
determine one or more updated mapping lookup tables based at least in part on the one or more measurements.

7. A user equipment (UE) for wireless communication, comprising:
at least one memory; and
at least one processor communicatively coupled with the at least one memory, the at least one processor configured to cause the UE to:
transmit, to a network node, an indication of a PC5 New Radio (NR) standardized quality of service (QoS) identifier (POI) associated with a sidelink communication;
receive, from the network node, an indication of a sidelink channel access priority class (SL CAPC) mapped to the POI;
perform a sidelink listen-before-talk (LBT) procedure associated with a sidelink channel based at least in part on the SL CAPC; and
transmit, to another UE, the sidelink communication via the sidelink channel based at least in part on the sidelink LBT procedure.

8. The UE of claim 7, wherein the at least one processor is further configured to cause the UE to receive, from a network node, an indication of a sidelink LBT mode; and
wherein the at least one processor, to perform the sidelink LBT procedure, is configured to cause the UE to perform the sidelink LBT procedure based at least in part on the sidelink LBT mode.

9. The UE of claim 7, wherein the at least one processor is further configured to cause the UE to map the PQI to the SL CAPC.

10. The UE of claim 7, wherein the at least one processor is further configured to cause the UE to determine a sidelink LBT mode; and
wherein the at least one processor, to perform the sidelink LBT procedure, is configured to cause the UE to perform the sidelink LBT procedure based at least in part on the sidelink LBT mode.

11. The UE of claim 7, wherein the at least one processor is further configured to cause the UE to transmit, to the other UE, an indication of at least one of the SL CAPC or a sidelink LBT mode.

12. The UE of claim 7, wherein the at least one processor is further configured to cause the UE to receive, from the other UE and via the sidelink channel, at least one of a feedback communication associated with the sidelink communication or a channel state information report.

13. The UE of claim 7, wherein the sidelink communication is associated with an inter-UE coordination (IUC) request, and wherein the IUC request includes an indication of at least one of the SL CAPC or a sidelink LBT mode.

14. The UE of claim 13, wherein the at least one processor is further configured to cause the UE to receive, from the other UE and via the sidelink channel, an IUC information communication associated with the IUC request.

15. The UE of claim 7, wherein the at least one processor is further configured to cause the UE to receive, from a network node, an indication of one or more sidelink unlicensed frequency bands, wherein the sidelink LBT procedure is associated with the one or more sidelink unlicensed frequency bands.

16. A user equipment (UE) for wireless communication, comprising:

at least one memory; and at least one processor communicatively coupled with the at least one memory, the at least one processor configured to cause the UE to:

transmit, to a network node, sidelink UE information indicating at least one of a capability to operate in one or more sidelink unlicensed frequency bands or a preferred sidelink unlicensed frequency band list;

receive, from the network node, an indication of one or more mapping lookup tables that map a plurality of PC5 New Radio (NR) standardized quality of service (QoS) identifiers (PQIs) to a plurality of sidelink channel access priority classes (SL CAPCs);

identify a first SL CAPC, from the plurality of SL CAPCs, based on a first PQI, from the plurality of PQIs, associated with a sidelink communication;

perform a sidelink listen-before-talk (LBT) procedure associated with a sidelink channel based at least in part on the first SL CAPC associated with the sidelink communication; and transmit, to another UE, the sidelink communication via the sidelink channel based at least in part on the sidelink LBT procedure.

17. The UE of claim 16, wherein the at least one processor is further configured to cause the UE to transmit, to the other UE, another indication of the one or more mapping lookup tables.

18. The UE of claim 16, wherein the at least one processor is further configured to cause the UE to:

transmit, to the network node, an indication of one or more measurements associated with the sidelink LBT procedure; and receive, from the network node, an indication of one or more updated mapping lookup tables, wherein the one or more updated mapping lookup tables are based at least in part on the one or more measurements.

19. The UE of claim 18, wherein the at least one processor is further configured to cause the UE to transmit, to the other UE, another indication of the one or more updated mapping lookup tables.

20. A user equipment (UE) for wireless communication, comprising:

at least one memory; and at least one processor communicatively coupled with the at least one memory, the at least one processor configured to cause the UE to:

receive, from a second UE, an indication of one or more mapping lookup tables that map a plurality of PC5 New Radio (NR) standardized quality of service (QoS) identifiers (PQIs) to a plurality of sidelink channel access priority classes (SL CAPCs);

receive, from the second UE, an indication of a first SL CAPC, from the plurality of SL CAPCs, that maps to a first POI, from the plurality of PQIs, associated with a sidelink communication;

perform a sidelink listen-before-talk (LBT) procedure associated with a sidelink channel based at least in part on the first SL CAPC being mapped to the first PQI associated with the sidelink communication; and transmit, to the other UE, the sidelink communication via the sidelink channel based at least in part on the sidelink LBT procedure.

21. The UE of claim 20, wherein the at least one processor is further configured to cause the UE to receive, from the other UE, an indication of a sidelink LBT mode; and wherein the at least one processor, to perform the sidelink LBT procedure, is configured to cause the UE to perform the sidelink LBT procedure based at least in part on the sidelink LBT mode.

22. The UE of claim 20, wherein the sidelink communication is associated with at least one of a feedback communication or a channel state information report.

23. The UE of claim 20, wherein the at least one processor, to receive the indication of the SL CAPC, is configured to cause the UE to receive the indication of the SL CAPC via an inter-UE coordination (IUC) request, wherein the sidelink communication is associated with an IUC information communication associated with the IUC request.

24. The UE of claim 20, wherein the at least one processor is further configured to cause the UE to receive, from the other UE, an indication of one or more updated mapping lookup tables.

* * * * *